(12) United States Patent
Jiang

(10) Patent No.: US 12,197,928 B2
(45) Date of Patent: Jan. 14, 2025

(54) DISPLAY METHOD AND APPARATUS, AND STORAGE MEDIUM

(71) Applicant: GUANGDONG OPPO MOBILE TELECOMMUNICATIONS CORP., LTD., Dongguan (CN)

(72) Inventor: Xue Jiang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/097,886

(22) Filed: Jan. 17, 2023

(65) Prior Publication Data
US 2023/0153132 A1 May 18, 2023

Related U.S. Application Data

(63) Continuation of application No. PCT/CN2021/092797, filed on May 10, 2021.

(30) Foreign Application Priority Data

Jul. 16, 2020 (CN) .......................... 202010685471.6

(51) Int. Cl.
*G06F 9/451* (2018.01)
*G06F 3/04815* (2022.01)
(Continued)

(52) U.S. Cl.
CPC .......... *G06F 9/451* (2018.02); *G06F 3/04815* (2013.01); *G06F 3/04817* (2013.01);
(Continued)

(58) Field of Classification Search
CPC .. G06F 9/451; G06F 3/04815; G06F 3/04817; G06F 3/04842; G06F 3/04847; G06F 3/0488; G06F 2203/04803
See application file for complete search history.

(56) References Cited

U.S. PATENT DOCUMENTS

2006/0265653 A1* 11/2006 Paasonen .................. G06F 9/00
715/779
2011/0265040 A1* 10/2011 Shin ..................... G06F 3/04883
715/830
(Continued)

FOREIGN PATENT DOCUMENTS

CN 103677514 A 3/2014
CN 105242898 A 1/2016
(Continued)

OTHER PUBLICATIONS

International Search Report and Written Opinion dated Aug. 12, 2021 in International Application No. PCT/CN2021/092797. English translation attached.
(Continued)

*Primary Examiner* — Daniel Samwel
(74) *Attorney, Agent, or Firm* — Sheppard, Mullin, Richter & Hampton LLP

(57) ABSTRACT

The present disclosure provides a display method. The display method includes: receiving a first operation, the first operation being used to adjust a proportion of a first region in a first display interface of an electronic device; and displaying, in the first region in response to the first operation, at least one launch entry of at least one application, when the proportion of the first region is smaller than or equal to a first threshold; and displaying, in the first region in response to the first operation, a display interface of a first application in the first region, when the proportion of the first region is greater than the first threshold. Embodiments of the present disclosure further provide a display apparatus and a storage medium.

18 Claims, 16 Drawing Sheets

(51) Int. Cl.
*G06F 3/04817* (2022.01)
*G06F 3/04842* (2022.01)
*G06F 3/04847* (2022.01)
*G06F 3/0488* (2022.01)

(52) U.S. Cl.
CPC ...... *G06F 3/04842* (2013.01); *G06F 3/04847* (2013.01); *G06F 3/0488* (2013.01); *G06F 2203/04803* (2013.01)

(56) References Cited

U.S. PATENT DOCUMENTS

| | | | | |
|---|---|---|---|---|
| 2013/0222321 | A1* | 8/2013 | Buening | G06F 3/04886 345/173 |
| 2014/0250390 | A1* | 9/2014 | Holmes | G06F 3/0482 715/760 |
| 2018/0052571 | A1* | 2/2018 | Seol | G06F 3/0488 |
| 2018/0088784 | A1* | 3/2018 | Zhu | G06F 3/0486 |
| 2018/0356972 | A1* | 12/2018 | Wang | G06F 3/04883 |
| 2019/0025989 | A1* | 1/2019 | Kim | G06F 3/0486 |
| 2019/0215452 | A1* | 7/2019 | Chen | H04N 5/772 |

FOREIGN PATENT DOCUMENTS

| | | |
|---|---|---|
| CN | 106557230 A | 4/2017 |
| CN | 106775313 A | 5/2017 |
| CN | 106775314 A | 5/2017 |
| CN | 108349423 A | 7/2018 |
| CN | 108549513 A | 9/2018 |
| CN | 108932093 A | 12/2018 |
| CN | 109062467 A | 12/2018 |
| CN | 109656461 A | 4/2019 |
| CN | 110347979 A | 10/2019 |
| CN | 110392295 A | 10/2019 |
| CN | 110489038 A | 11/2019 |
| CN | 111857505 A | 10/2020 |
| EP | 3364281 A1 | 8/2018 |
| JP | 2017208111 A | 11/2017 |

OTHER PUBLICATIONS

First Office Action from corresponding Chinese Application No. 202010685471.6, dated Jun. 9, 2021 . English translation attached.
The Second Office Action from corresponding Chinese Application No. 202010685471.6, dated Dec. 6, 2021. English translation attached.
The Grant Notice from corresponding Chinese Application No. 202010685471.6, dated Apr. 8, 2022 . English translation attached.
Extended European Search Report dated Dec. 11, 2023 received in European Patent Application No. EP21841713.7.
The First Office Action from corresponding Chinese Application No. 202210674621.2, dated Jan. 29, 2024 . English translation attached.

* cited by examiner

DISPLAY METHOD AND APPARATUS, AND STORAGE MEDIUM

CROSS-REFERENCE TO RELATED APPLICATION

This application is a continuation of International Patent Application No. PCT/CN2021/092797, filed on May 10, 2021, which claims a priority to Chinese Patent Application No. 202010685471.6 filed on Jul. 16, 2020, the entire disclosure of which are incorporated herein by reference.

FIELD

The present disclosure relates to the field of terminal device technologies, and more particularly, to a display method and apparatus and a storage medium.

BACKGROUND

With the increasingly complex use scenarios of various electronic devices such as cell phones and laptops, a user needs to perform split-screen display on a display screen of an electronic device to view information of different applications simultaneously on different split-interfaces. In the related art, operation steps to realize split-screen display of two applications are cumbersome, which increase difficulty in using a split-screen feature by the user, resulting in low efficiency of a split-screen operation.

SUMMARY

Embodiments of the present disclosure provide a display method and apparatus and a storage medium.

Technical solutions of the embodiments of the present disclosure are implemented as follows.

In a first aspect, an embodiment of the present disclosure provides a display method. The method includes: receiving a first operation, the first operation being used to adjust a proportion of a first region in a first display interface of an electronic device; and displaying, in the first region in response to the first operation, at least one launch entry of at least one application, when the proportion of the first region is smaller than or equal to a first threshold; and displaying, in the first region in response to the first operation, a display interface of a first application in the first region, when the proportion of the first region is greater than the first threshold.

In a second aspect, the present disclosure provides a display apparatus. The display apparatus includes a memory, a processor, and an executable program stored on the memory and executable by the processor. The processor, when executing the executable program, performs the steps of the display method described above.

In a third aspect, the present disclosure provides a storage medium. The storage medium stores an executable program. The executable program, when executed by a processor, implements the display method described above.

DETAILED DESCRIPTION

The present disclosure will be described in further detail below with reference to the accompanying drawings and embodiments. It should be understood that the specific embodiments described here are only used to explain, rather than limiting, the present disclosure.

Figure 1:
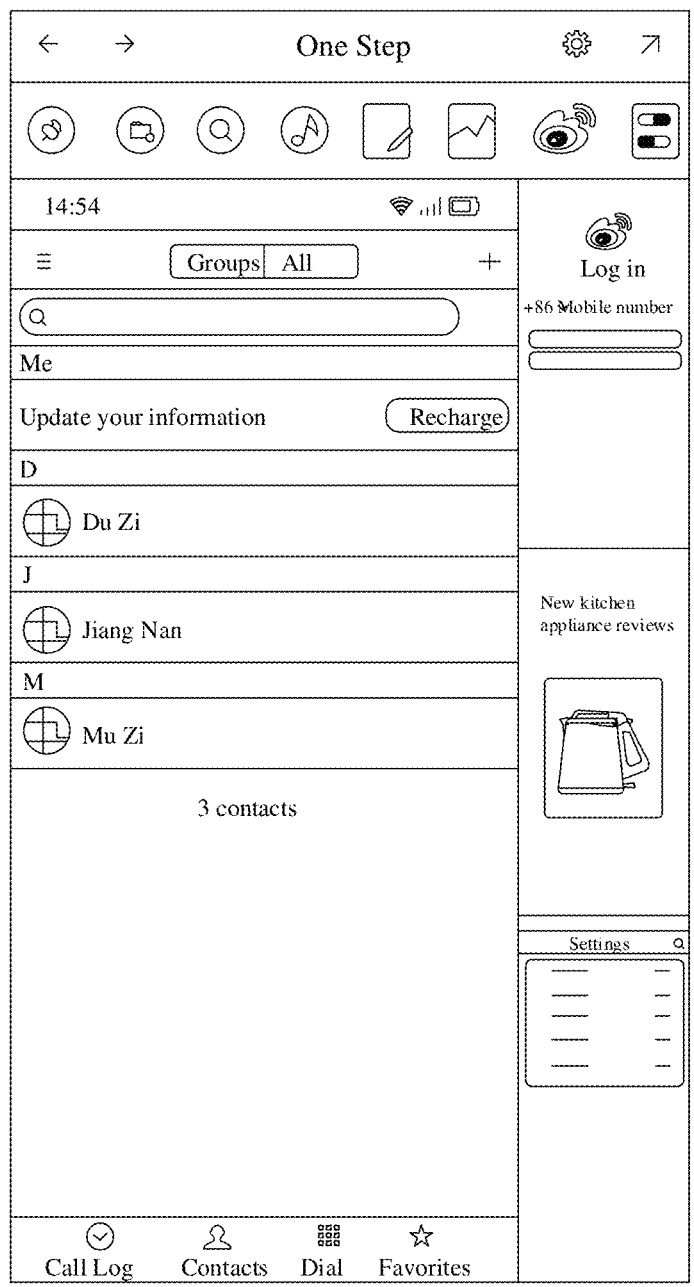
FIG. 1 is a schematic diagram of split-screen display in the related art.

In the related art, a multi-split-screen solution includes one-step customized screen splitting. As illustrated in FIG. 1, a screen area of a mobile terminal may be divided into four regions, with a main application occupying a larger proportion of the screen area and three auxiliary applications each occupying a smaller proportion of the screen area. Length-width ratios of the four applications are consistent with a length-width ratio of a display screen of the mobile terminal.

In the related art, split-screen solutions include the following ones.

1) Entering a split-screen mode via a split-screen function at a top right corner of an application among most recent tasks, as is in line with the native Android system.

Figure 2:
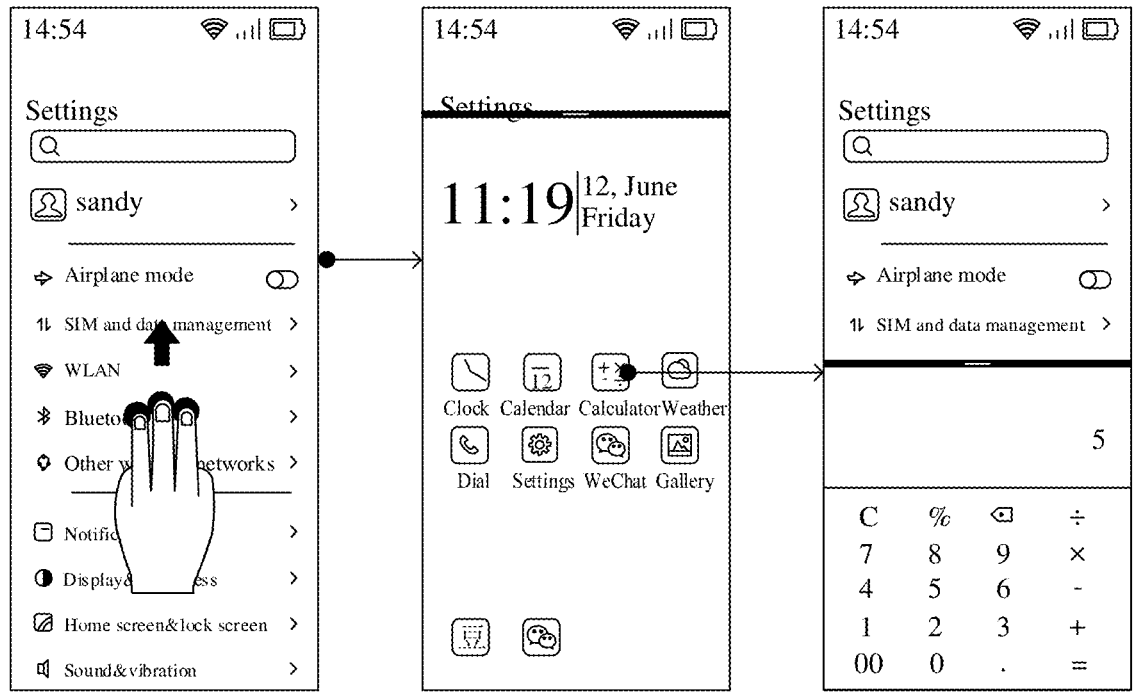
FIG. 2 is a schematic diagram of a first type of split-screen initiating operation in the related art.

2) Turning on the split-screen mode through a swipe-up operation performed with three fingers. As illustrated in FIG. 2, when a display interface of an application is displayed in a display screen of an electronic device, the split-screen mode is turned on by performing a swipe-up touch operation with three fingers, a main interface of the electronic device is displayed in a lower region of the display screen after the split-screen mode is turned on, and based on a selection operation, a display interface of an application corresponding to the selection operation is displayed in the lower region of the display screen, so that a split-screen display solution is realized.

Figure 3:
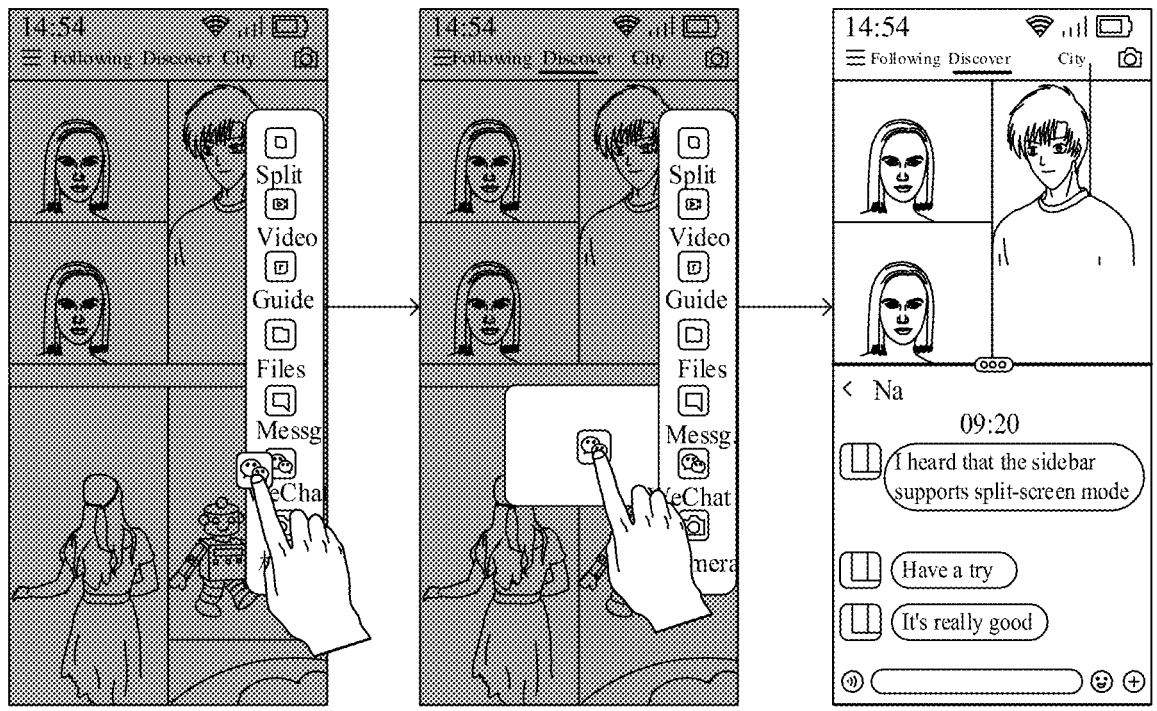
FIG. 3 is a schematic diagram of a second type of split-screen initiating operation in the related art.
Figure 4:
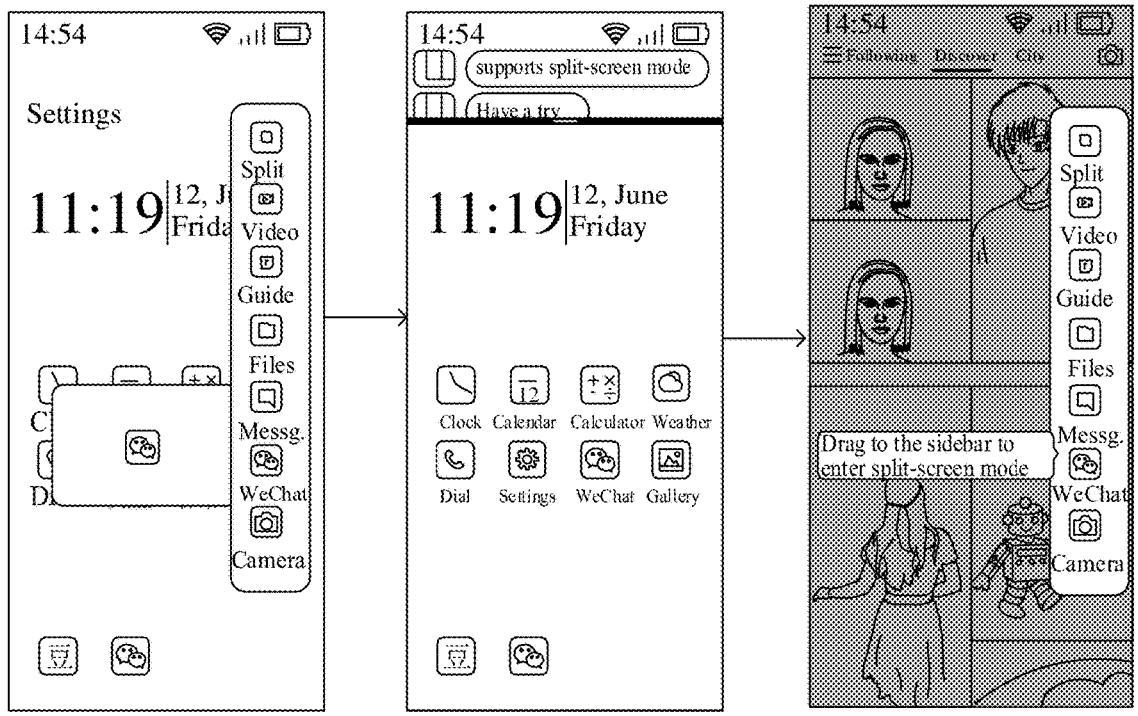
FIG. 4 is a schematic diagram of a third type of split-screen initiating operation in the related art.

3) Turning on the split-screen mode through an operation of long pressing and dragging an application from a side toolbar. As illustrated in FIG. 3, when a display interface of an application is displayed in the display screen of the electronic device, the split-screen display solution is realized through long pressing a launch entry of an application in the side toolbar, dragging the launch entry of the application to a display region outside the side toolbar, and releasing the launch entry of the application. Or, as illustrated in FIG. 4, when a main interface is displayed in the display screen of the electronic device, the split-screen display solution is realized through: displaying a display interface corresponding to an application in an upper region of the display screen by long pressing a launch entry of the application in the side toolbar, dragging the launch entry of the application to a display region outside the side toolbar, and releasing the launch entry of the application; and displaying the main interface in the lower region of the display screen, and displaying, based on a selection operation, a display interface of an application corresponding to the selection operation in the lower region of the display screen.

Figure 5:
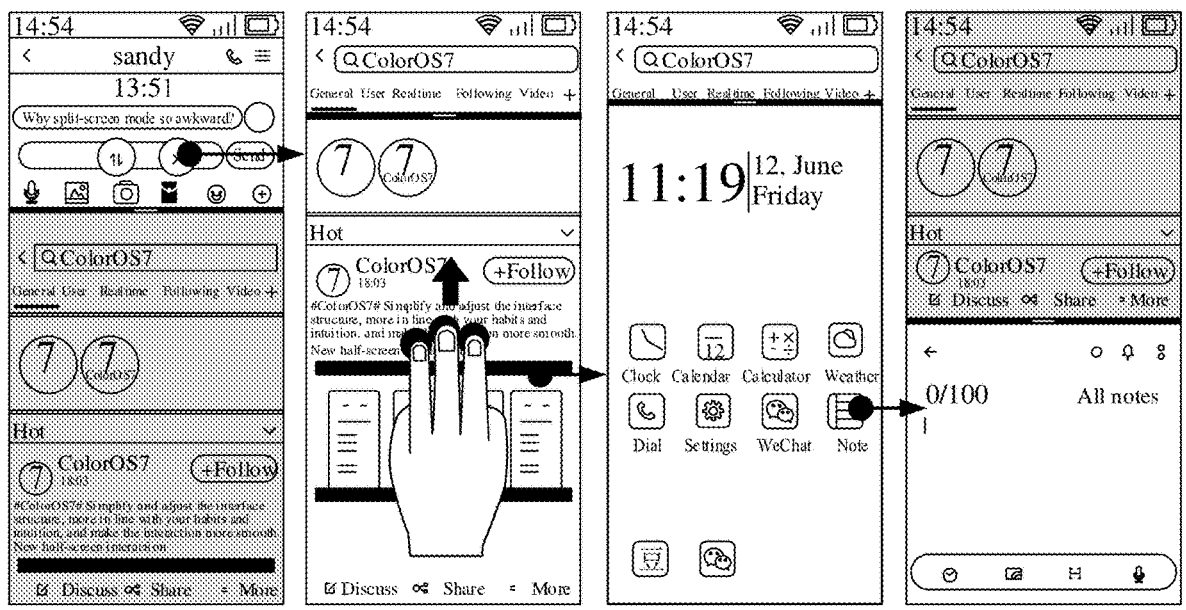
FIG. 5 is a schematic diagram of operations to switch an application for split-screen display in a split-screen state in the related art.

In the course of implementing split-screen display of information, it is found that, when the display screen is already split, it takes at least four steps of operations to change a displayed application in any region. As illustrated in FIG. 5, the at least four steps of operations specifically include: ① turning off the split-screen mode; ② turning on the split-screen mode by a touch operation; ③ performing a selection operation; and ④ displaying a display interface of an application corresponding to the selection operation in the lower region of the display screen. In addition, as illustrated in FIG. 5, before an application change is performed, the upper region of the display interface displays QQ and the lower region of the display interface displays MicroBlog. When one wants to turn off QQ and realize split-screen display of MicroBlog and a memo, the upper region of the display interface will display MicroBlog and the lower region of the display interface will display the memo after the above operations ① to ② are performed. That is, the originally-displayed application will change its position on the split screen.

In summary, such a method for split-screen display has the following drawbacks.

1) Low screen utilization, and collaboration is only possible for at most two applications.

2) More than 2 steps are required for turning on the split-screen mode.

3) After the split-screen mode is turned on, it takes at least 4 steps to change one of the applications, and the display position of the originally-displayed application will be changed.

Considering the above drawbacks, it is difficult for the related art to meet a demand for true multi-application collaboration and efficient switching. In view of problems in existing split-screen methods, the present disclosure provides a display method, which is capable of solving technical difficulties and drawbacks that cannot be overcome in existing solutions.

Any one of a first operation to a twentieth operation mentioned in the specification of the present disclosure may be an air gesture operation over a screen of the electronic device, or a touch operation on the screen of the electronic device. For example, the first operation is an operation to adjust a proportion of a first region in a first display interface of the electronic device. The first operation may be an air swiping gesture operation over the screen of the electronic device or a swiping touch operation on the screen of the electronic device.

Figure 6:
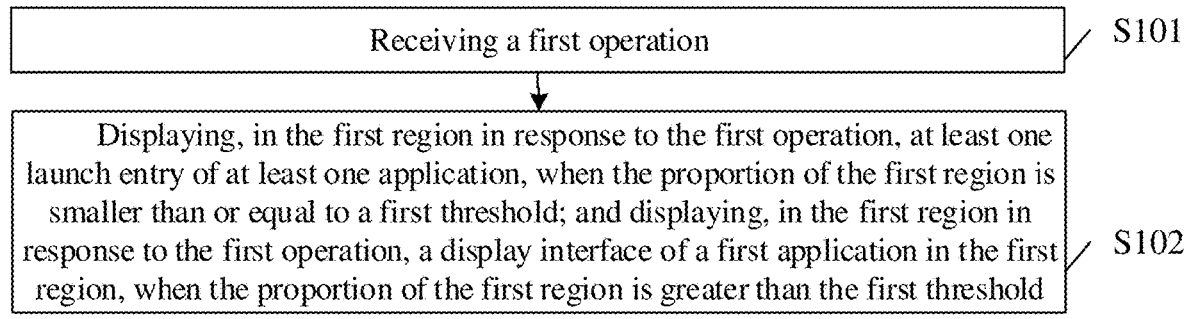
FIG. 6 is a first optional flowchart of a display method according to an embodiment of the present disclosure.

FIG. 6 illustrates a first optional flowchart of a display method according to an embodiment of the present disclosure, which will be described based on actions at block S101 and S102.

At block S101, a first operation is received.

In some embodiments, an action of receiving, by the electronic device, the first operation includes detecting and/or recognizing, by the electronic device, the first operation with respect to the screen of the electronic device. The first operation is used to adjust the proportion of the first region in the first display interface of the electronic device.

In some embodiments, the proportion of the first region in the first display interface includes a ratio of a size of the first region to a size of the first display interface. The ratio may be determined based on the size of the first region and the size of the first display interface. The size of the first region may be a number of pixels determined by the electronic device based on a size and a resolution of the screen of the electronic device, or may be an area determined by the electronic device based on a size of a screen device. For example the first region may be 330 px*768 px; or a first region may be 330 mm*759 mm. Accordingly, the proportion of the first region=size of the first region/size of the first display interface.

In some embodiments, the first threshold is a predetermined ratio. For example, the first threshold is predetermined by the electronic device as 1/N. When the proportion of the first region is 1/(N−1), the proportion of the first region is greater than the first threshold. When the proportion of the first region is 1/(N+1), the proportion of the first region is smaller than the first threshold. N is any value greater than 1.

In some embodiments, the first display interface of the electronic device includes the first region and a second region. The first region is completely non-overlapping with or partially overlapping with the second region. The first region and the second region together form the first display interface. The first region being completely non-overlapping with the second region includes that the first display interface is divided into two completely non-overlapping regions by means of a screen-splitting operating rod of the first display interface. The two completely non-overlapping regions correspond to the first region and the second region, respectively. The first region being partially overlapping with the second region includes that no clear boundary exists at a junction between the first region and the second region. Content displayed in the second region can be partially displayed in the first region, and content displayed in the first region can be partially displayed in the second region. The method may further include: displaying transparently, at the junction between the first region and the second region, the content displayed in the first region and the content displayed in the second region.

In some embodiments, the first region of the first display interface may be the upper region of the first display interface delimited by the screen-splitting operating rod of the first display interface, and the second region of the first display interface may be the lower region of the first display interface delimited by the screen-splitting operating rod of the first display interface. Or, the first region of the first display interface may be a left region of the first display interface delimited by the screen-splitting operating rod of the first display interface, and the second region of the first display interface may be a right region of the first display interface delimited by the screen-splitting operating rod of the first display interface.

In some embodiments, the first operation may be an operation on the screen-splitting operating rod. When the first region is in an up-and-down relation with the second region, the proportion of the first region is reduced by dragging the screen-splitting operating rod upwards, or the proportion of the first region is increased by dragging the screen-splitting operating rod downwards. Therefore, the first operation may include: dragging the screen-splitting operating rod upwards; or dragging the screen-splitting operating rod downwards; or dragging the screen-splitting operating rod to the left; or dragging the screen-splitting operating rod to the right.

At block S102, at least one launch entry of at least one application is displayed in the first region in response to the first operation, when the proportion of the first region is smaller than or equal to a first threshold; and a display interface of a first application in the first region is displayed in the first region in response to the first operation, when the proportion of the first region is greater than the first threshold.

In some embodiments, actions performed by the electronic device in response to the first operation include: adjusting the proportion of the first region based on the first operation; and determining display content in the first region and/or display content in the second region based on the proportion of the first region. For example, when the screen-splitting operating rod divides the screen of the electronic device into upper and lower regions, the proportion of the first region is reduced by dragging the screen-splitting operating rod upwards; or the proportion of the first region is increased by dragging the screen-splitting operating rod downwards. Or, when the screen-splitting operating rod divides the screen of the electronic device into left and right regions, the proportion of the first region is reduced by dragging the screen-splitting operating rod to the left (e.g., the proportion of the first region is adjusted from 1 N to 1/(N+1)), or the proportion of the first region is increased by dragging the screen-splitting operating rod to the right (e.g., the proportion of the first region is adjusted from 1/(N+1) to 1/N).

In some embodiments, the action of determining the display content in the first region and/or the display content in the second region based on the proportion of the first region includes at least the following two cases.

Case 1: The Proportion of the First Region is Smaller than or Equal to the First Threshold.

In some embodiments, when the proportion of the first region is smaller than or equal to the first threshold, the action of determining the display content in the first region and/or the display content in the second region includes: displaying in the first region the at least one launch entry of the at least one application; and/or displaying in the second region a display interface of a second application. The action of displaying in the second region the display interface of the second application includes: minifying the display interface of the second application by a first scale, and displaying in the second display region the entire minified display interface of the second application. A size of the entire minified display interface of the second application is smaller than a size of the second region. The at least one launch entry of the at least one application displayed in the first region excludes a launch entry of the second application.

In other embodiments, when the proportion of the first region is smaller than or equal to the first threshold, the action of determining the display content in the first region and/or the display content in the second region includes: displaying in the first region the at least one launch entry of the at least one application; and/or displaying in the second region a second display interface minified by the first scale. The second display interface may be the main interface of the electronic device, including: an interface displayed on a screen of the electronic device after the electronic device is turned on but responds to no operation; or an interface displayed on the screen of the electronic device when the electronic device is in a standby mode. The action of displaying in the second region the second display interface includes: minifying the main interface of the electronic device by the first scale, and displaying in the second display region the entire minified main interface of the electronic device. A size of the minified main interface of the electronic device is smaller than the size of the second region. The at least one launch entry of the at least one application displayed in the first region may be completely identical to or completely different from one or more launch entries of one or more applications included in the main interface of the minified main interface of the electronic device. The at least one launch entry of the at least one application displayed in the first region is unassociated with the one or more launch entries of the one or more applications included in the main interface of the minified main interface of the electronic device. An operation in the first region is also unassociated with an operation in the second region.

Case 2: The Proportion of the First Region is Greater than the First Threshold.

In some embodiments, when the proportion of the first region is greater than the first threshold, the action of determining the display content in the first region and/or the display content in the second region includes: displaying the display interface of the first application in the first region; and/or displaying the display interface of the second application in the second region of the first display interface. Or, when the proportion of the first region is greater than the first threshold, the action of determining the display content in the first region and/or the display content in the second region further includes: displaying the display interface of the first application in the first region; and/or displaying the second display interface in the second region of the first display interface. The first application includes an application corresponding to a launch entry of an application located at a first position within the first region, when the proportion of the first region is smaller than or equal to the first threshold. The first position may be a leftmost end or a rightmost end of the first region when the proportion of the first region is smaller than or equal to the first threshold. Accordingly, the launch entry of the application located at the first position is a launch entry of an application displayed at the leftmost end or the rightmost end of the first region. The at least one launch entry of the at least one application in the first region is sequentially arranged in order of end-of-use time from left to right or from right to left. A launch entry of a most-recently ended application is displayed at the first position. For example, use of application A ends at 13:50 p.m., use of application B ends at 13:30 p.m., use of application C ends at 12:50 p.m., and use of application D ends at 12:00 a.m. In the first region, a launch entry of application B, a launch entry of application A, a launch entry of application D, and a launch entry of application C are sequentially displayed; or in the first region, the launch entry of application C, the launch entry of application D, the launch entry of application A, and the launch entry of application B are sequentially displayed.

In some embodiments, the action of displaying the display interface of the first application in the first region includes: not minifying the display interface of the first application, a width of the display interface of the first application being equal to a width of the first region; and partially displaying the display interface of the first application in the first region. The display interface of the first application may be fully displayed through an operation on the first region. For example, the display interface of the first application in the first region may be adjusted by scrolling a scroll bar of the first region, to fully display the display interface of the first application. Correspondingly, a method for displaying the display interface of the second application in the second region is identical to a method for displaying the display interface of the first application in the first region, and is therefore omitted here.

Figure 7:
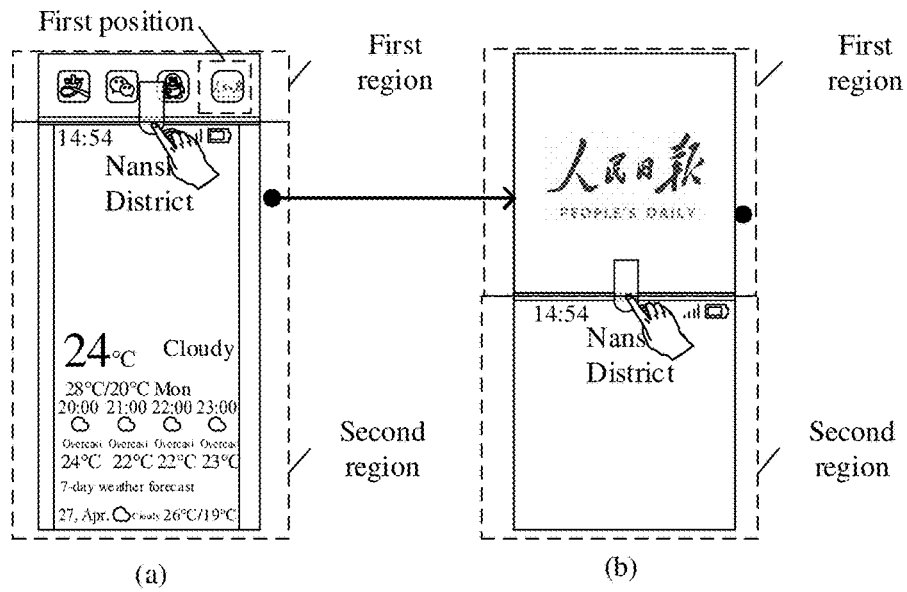
FIG. 7 is an optional schematic display diagram of an electronic device when the electronic device switches a proportion of a first region from being smaller than or equal to a first threshold to being greater than the first threshold according to an embodiment of the present disclosure.
Figure 7:
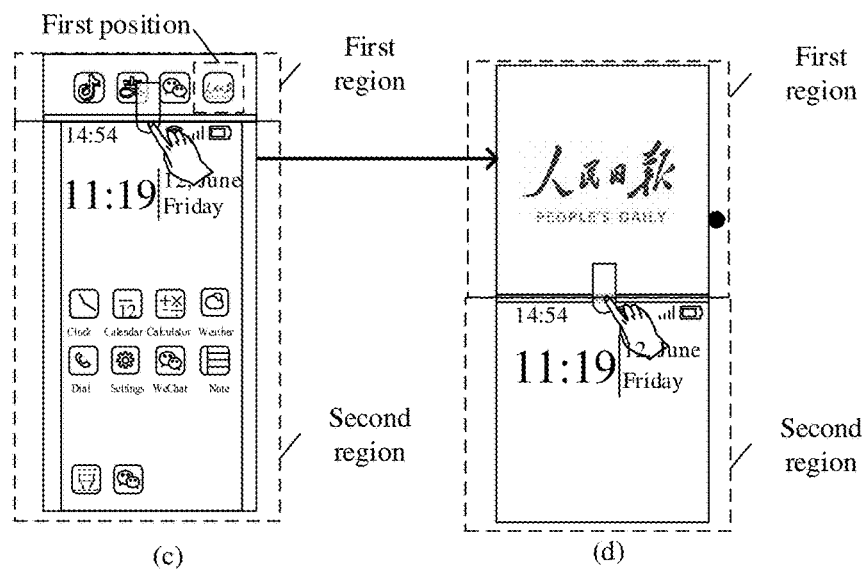

FIG. 7 illustrates an optional schematic display diagram of an electronic device when the electronic device switches the proportion of the first region from being smaller than or equal to the first threshold to being greater than the first threshold according to an embodiment of the present disclosure.

As illustrated in FIG. 7, the first region is the upper region of the display interface of the electronic device. The first position of the first region is in FIG. 7(a) or FIG. 7(c) a position corresponding to a rightmost application in the first region. The second region is the lower region of the display interface of the electronic device. A case where the proportion of the first region is greater than the first threshold may be that the electronic device switches, in response to the first operation, the proportion of the first region from being smaller than or equal to the first threshold to being greater than the first threshold by adjusting the screen-splitting operating rod downwards or to the right. In this case, the action of determining the display content in the first region and/or the display content in the second region includes: switching from displaying the at least one launch entry of the at least one application in the first region to displaying the display interface of the first application in the first region; and/or displaying the display interface of the second application in the second region of the first display interface. Or, the action of determining the display content in the first region and/or the display content in the second region may further include: switching from displaying the at least one launch entry of the at least one application in the first region to displaying the display interface of the first application in the first region; and/or displaying the main interface of the electronic device in the second region of the first display interface.

As illustrated in FIG. 7(a), the proportion of the first region is smaller than or equal to the first threshold. The action of determining the display content in the first region and/or the display content in the second region includes: displaying the at least one launch entry of the at least one application in the first region; and/or minifying the display interface of the second application of the electronic device by the first scale, and displaying the minified display interface of the second application in the second display region. The minified display interface of the second application has a size smaller than that of the second region.

As illustrated in FIG. 7(b), the proportion of the first region is greater than the first threshold. The action of displaying the display interface of the first application in the first region includes: not minifying the display interface of the first application, the width of the display interface of the first application being equal to the width of the first region; and partially displaying the display interface of the first application in the first region. The display interface of the first application may be fully displayed through an operation on the first region. For example, the display interface of the first application in the first region may be adjusted through the scroll bar of the first region to fully display the display interface of the first application.

As illustrated in FIG. 7(c), the proportion of the first region is smaller than or equal to the first threshold. The action of determining the display content in the first region and/or the display content in the second region includes: displaying the at least one launch entry of the at least one application in the first region; and/or minifying the main interface of the electronic device by the first scale, and displaying the entire minified main interface of the electronic device in the second display region. The minified main interface of the electronic device has a size smaller than that of the second region.

As illustrated in FIG. 7(d), the proportion of the first region is greater than the first threshold. The action of displaying the display interface of the first application in the first region includes: not minifying the display interface of the first application, the width of the display interface of the first application being equal to the width of the first region; and partially displaying the display interface of the first application in the first region. The display interface of the first application may be fully displayed through an operation on the first region. For example, the display interface of the first application in the first region may be adjusted through the scroll bar of the first region to fully display the display interface of the first application.

Figure 8:
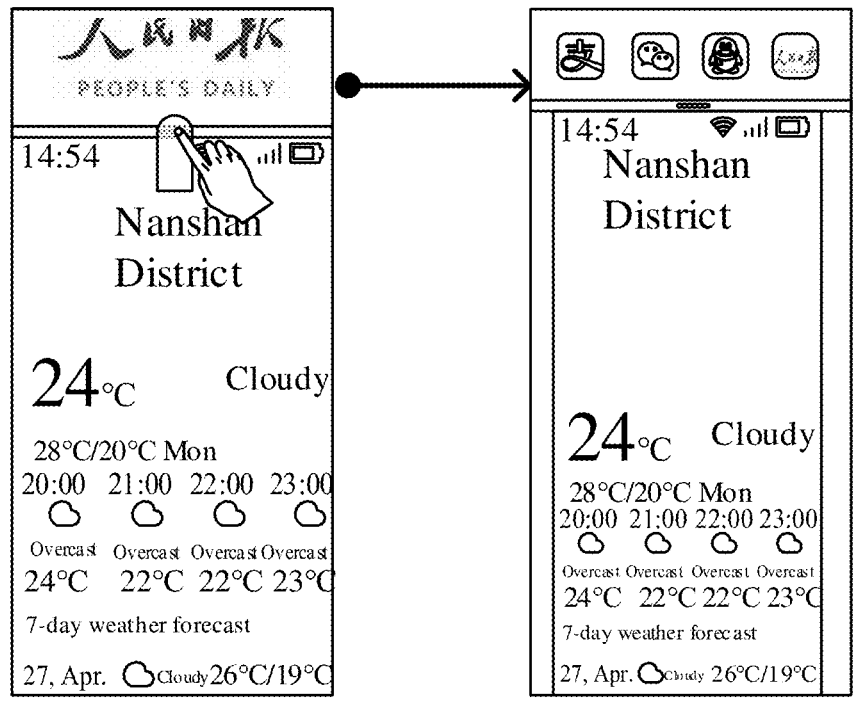
FIG. 8 is an optional schematic display diagram of an electronic device when a proportion of a first region is switched from being greater than a first threshold to being smaller than or equal to the first threshold according to an embodiment of the present disclosure.

FIG. 8 is an optional schematic display diagram of an electronic device when the electronic device switches the proportion of the first region from being greater than the first threshold to being smaller than or equal to the first threshold according to an embodiment of the present disclosure.

As illustrated in FIG. 8, the proportion of the first region being smaller than or equal to the first threshold may be that the proportion of the first region is switched, by the electronic device in response to the first operation by means of adjusting the screen-splitting operating rod upwards or to the left, from being greater than the first threshold to being smaller than or equal to the first threshold. In this case, the launch entry of the first application is displayed at the first position of the first region, and at least one launch entry of at least one other application is displayed at at least one other position of the first display region; and the second region displays the display interface of the second application.

In some embodiments, the proportion of the first region being greater than the first threshold includes that: both the proportion of the first region and the proportion of the second region are greater than the first threshold; or the proportion of the first region is greater than the first threshold and the proportion of the second region is smaller than or equal to the first threshold. When both the proportion of the first region and the proportion of the second region are greater than the first threshold, the first region and the second region display the display interface of the first application and the display interface of the second application, respectively, as described in the above-mentioned solutions. The method further includes, when the proportion of the first region is greater than the first threshold and the proportion of the second region is smaller than or equal to the first threshold: displaying the display interface of the first application in the first region; and/or displaying the at least one launch entry of the at least one application in the second region of the first display interface.

Figure 9:
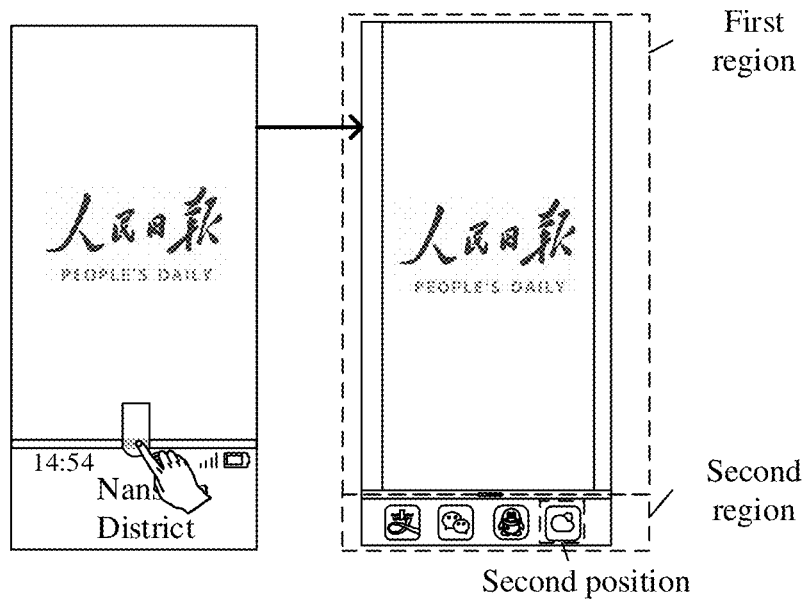
FIG. 9 is an optional schematic display diagram of an electronic device when the electronic device switches a proportion of a second region from being greater than a first threshold to being smaller than or equal to the first threshold according to an embodiment of the present disclosure.

FIG. 9 illustrates an optional schematic display diagram of an electronic device when the electronic device switches the proportion of the second region from being greater than the first threshold to being smaller than or equal to the first threshold according to an embodiment of the present disclosure.

As illustrated in FIG. 9, the proportion of the second region being smaller than or equal to the first threshold may be that the proportion of the second region is switched, by the electronic device in response to the first operation by means of adjusting the screen-splitting operating rod downwards or to the right, from being greater than the first threshold to being smaller than or equal to the first threshold. In this case, the launch entry of the second application is displayed at a second position of the second region, and at least one launch entry of at least one other application is displayed at at least one other position of the second region; and the first region displays the display interface of the first application. Or the display interface of the second application is displayed at the second position of the second region, and the first region displays the display interface of the first application.

In some embodiments, the at least one launch entry of the at least one application includes one or more launch entries of a first number of applications run by the electronic device in a first time period. The first time period may be a period of time predetermined by the electronic device. The first number may be the number of applications predetermined by the electronic device. The one or more launch entries of the first number of applications are displayed in the first region sequentially from left to right or from right to left based on end-of-use time; or the one or more launch entries of the first number of applications are displayed in the first region sequentially from top to bottom or from bottom to top based on the end-of-use time. The number of applications run by the electronic device in the first time period may be greater than, smaller than, or equal to the first number.

When the number of applications run by the electronic device in the first time period is greater than the first number, the one or more launch entries of the first number of applications are displayed in the first region in order of the end-of-use time. For example, when the first number is 4, applications used by the electronic device in the first time period are, if sequenced in reverse chronological order of the end-of-use time, application A, application B, application C, application D, application E, application F, application G, and application H; and in the first region, the launch entry of application A, the launch entry of application B, the launch entry of application C, and the launch entry of application D are displayed sequentially, or the launch entry of application D, a launch entry of application E, a launch entry of application F, and a launch entry of application G are displayed sequentially.

When the number of applications run by the electronic device in the first time period is equal to the first number, one or more launch entries of one or more applications run in the first time period are sequentially displayed in the first region in order of end-of-use time. For example, when the first number is 4, applications used by the electronic device in the first time period are, if sequenced in order of end-of-use time, application A, application B, application C, and application D. In the first region, the launch entry of application A, the launch entry of application B, the launch entry of application C, and the launch entry of application D are displayed in order from left to right, or from right to left, or from top to bottom, or from bottom to top.

When the number of applications run by the electronic device in the first time period is smaller than the first number, one or more launch entries of one or more applications run in the first time period are displayed in the first region in order of end-of-use time. For example, when the first number is 4, applications used by the electronic device in the first time period are, if sequenced in order of end-of-use time, application A, application B, and application C. The launch entry of application A, the launch entry of application B, and the launch entry of application C are displayed sequentially in the first region.

In some embodiments, the at least one launch entry of the at least one application being displayed in the order of end-of-use time may be that: suppose that use of application A ends at 13:50 p.m., use of application B ends at 13:30 p.m., use of application C ends at 12:50 p.m., and use of application D ends at 12:00 a.m., then the launch entry of application B, the launch entry of application A, the launch entry of application D, and the launch entry of application C are displayed sequentially in the first region, or the launch entry of application C, the launch entry of application D, the launch entry of application A, and the launch entry of application B are displayed sequentially in the first region.

With the display method according to the embodiments of the present disclosure, by receiving and responding to the first operation and adjusting the proportion of the first region, the electronic device is capable of displaying the at least one launch entry of the at least one application in the first region and displaying the display interface of the second application in the second region; or displaying the display interface of the first application in the first region and displaying the display interface of the second application in the second region, thereby realizing display of the first application and display of the second application and improving screen splitting efficiency.

In some embodiments, the method further includes, prior to the action of receiving the first operation at S101, actions at block S201 and block S202.

Figure 10:
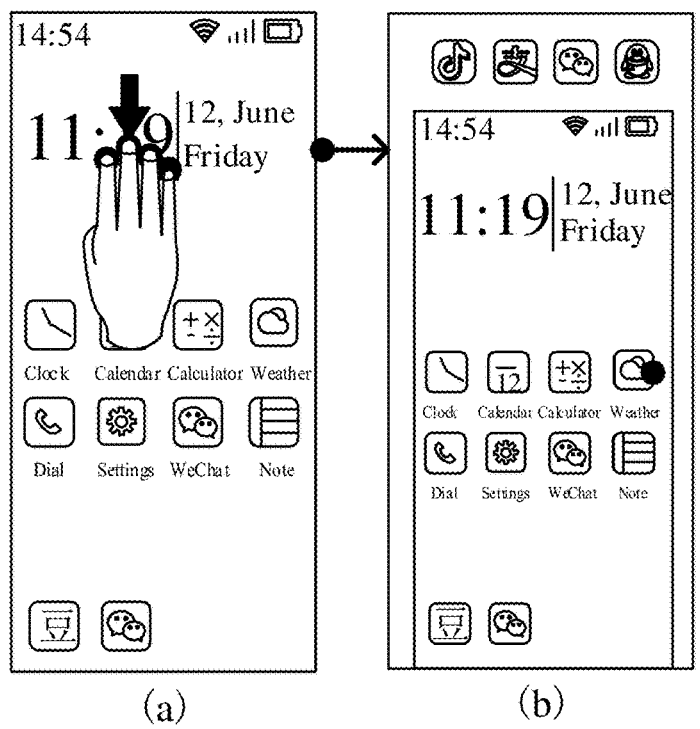
FIG. 10 is an optional schematic display diagram of an electronic device in response to a second operation according to an embodiment of the present disclosure.
Figure 11:
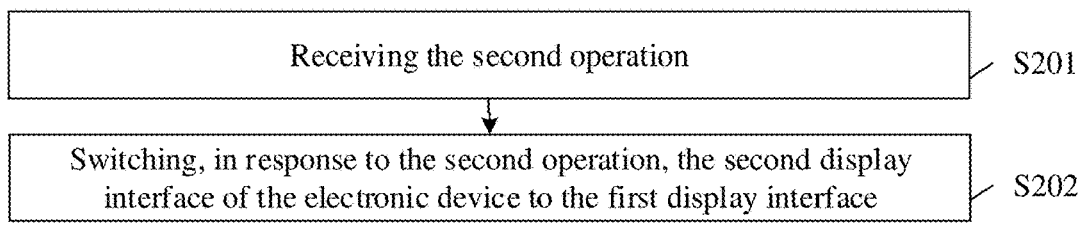
FIG. 11 is a second optional flowchart of a display method according to an embodiment of the present disclosure.

FIG. 10 illustrates an optional schematic display diagram of an electronic device in response to a second operation according to an embodiment of the present disclosure. FIG. 11 illustrates a second optional flowchart of a display method according to an embodiment of the present disclosure. Description will be made in conjunction with FIG. 10 and FIG. 11.

At block S201, the second operation is received.

In some embodiments, an action of receiving, by the electronic device, the second operation includes detecting and/or recognizing, by the electronic device, the second operation with respect to the screen of the electronic device. The second operation is used for switching the display interface of the electronic device.

In some embodiments, the action of switching the display interface of the electronic device includes switching the second display interface of the electronic device to the first display interface. The second display interface may be the main interface of the electronic device displayed based on the size of the screen of the electronic device. That is, an area size of the second display interface for displaying the main interface of the electronic device is identical to the size of the screen of the electronic device.

At block S202, the second display interface of the electronic device is switched, in response to the second operation, to the first display interface.

In some embodiments, when the display interface of the electronic device is the first display interface, the second region of the first display interface displays one or more launch entries of one or more applications in the second display interface and the first region of the first display interface displays the at least one launch entry of the at least one application. That is, the electronic device is screen-split to display information of the electronic device in a split-screen manner. For example, information of a main page of the electronic device and an interface of one application in the electronic device are displayed in the split-screen manner; or interfaces of two applications in the electronic device are displayed in the electronic device in the split-screen manner.

In some embodiments, the action of displaying the second display interface in the second region of the first display interface includes displaying, in the second region of the first display interface, the launch entries of all of the one or more applications included in the second display interface minified by the first scale.

In some embodiments, the second operation may include any of swiping up with four fingers, performing a grasp operation on the screen with five fingers, three consecutive taps, swiping up with two fingers, or the like.

As illustrated in FIG. 10(a), the second display interface is the main interface of the screen of the electronic device. When the second operation is received and in response to the second operation, the main interface of the electronic device is minified by the first scale and displayed in the second region of the first display interface (as illustrated in FIG. 10(b)). The first region of the first display interface displays the at least one launch entry of the at least one application. The at least one launch entry of the at least one application includes the one or more launch entries of the first number of applications run by the electronic device in the first time period.

In this way, with the display method according to the embodiments of the present disclosure, the electronic device can switch from the second display interface to the first display interface based on the second operation, facilitating subsequent implementations of the actions at block S101 and S102 of the display method and improving the screen splitting efficiency.

In some embodiments, on the basis of the actions at blocks S101 and S102 and the actions at blocks S201 and S202, the method further includes actions at blocks S203 and S204.

Figure 12:
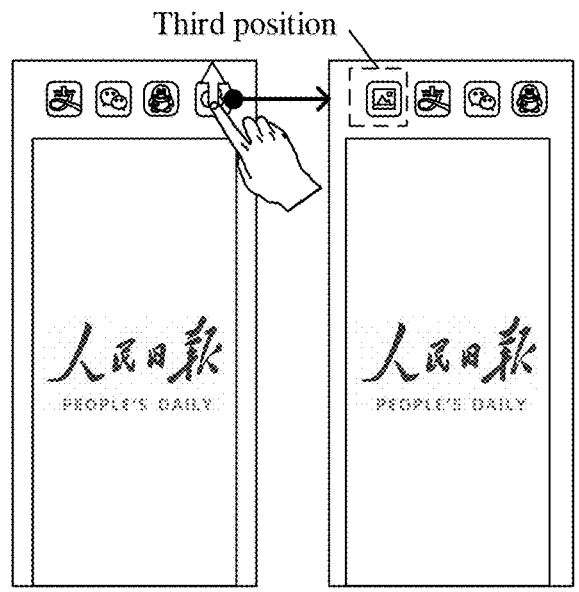
FIG. 12 is an optional schematic display diagram of an electronic device in response to a fourth operation according to an embodiment of the present disclosure.
Figure 13:
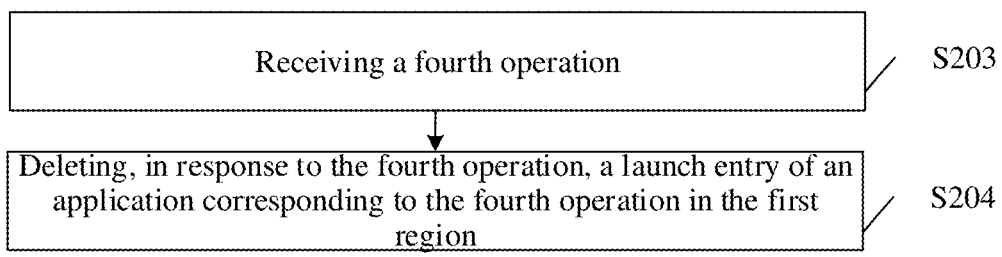
FIG. 13 is a third optional flowchart of a display method according to an embodiment of the present disclosure.

FIG. 12 illustrates an optional schematic display diagram of an electronic device in response to a fourth operation according to an embodiment of the present disclosure. FIG. 13 illustrates a third optional flowchart of a display method according to an embodiment of the present disclosure. Description will be made in conjunction with FIG. 12 and FIG. 13.

At block S203, a fourth operation is received.

In some embodiments, an action of receiving, by the electronic device, the fourth operation includes detecting and/or recognizing, by the electronic device, the fourth operation with respect to the screen of the electronic device. The fourth operation is used to delete a launch entry of an application within the first region of the first display interface, when the proportion of the first region is smaller than or equal to the first threshold.

In some embodiments, the fourth operation may include: selecting a launch entry of an application, and swiping up or down and releasing the launch entry of the application.

At block S204, a launch entry of an application corresponding to the fourth operation in the first region is deleted in response to the fourth operation.

In some embodiments, an action of deleting, by the electronic device, the launch entry of the application corresponding to the fourth operation in the first region includes: deleting the launch entry of the application corresponding to the fourth operation; and when the number of applications run by the electronic device in the first time period is greater than the first number, displaying a launch entry of a newly-added application at a third position in the first region, and adjusting one or more display positions of one or more launch entries of remaining one or more applications in the first region; or when the number of applications run by the electronic device in the first time period is smaller than or equal to the first number, adjusting the one or more display positions of the one or more launch entries of the remaining one or more applications in the first region. A deletion operation performed on the launch entry of the application in the first region through the fourth operation does not affect normal display of the main interface or the display interface of the application in the second region. That is, regardless of how many launch entries of applications are deleted through the fourth operation, the second region keeps displaying the display interface of the second region as it was before reception of the fourth operation, without changing displayed content due to the fourth operation.

As illustrated in FIG. 12, when the number of applications run by the electronic device in the first time period is greater than the first number, e.g., four, applications used by the electronic device in the first time period are, if sequenced in order of last used time, application A, application B, application C, application D, application E, application F, application G, and application H, and the launch entry of application A, the launch entry of application B, the launch entry of application C, and the launch entry of application D are displayed sequentially in the first region. After the launch entry of application A is deleted in response to the fourth operation, positions of the launch entry of application B, the launch entry of application C, and the launch entry of application D are adjusted, and the launch entry of application E is displayed at the third position in the first region of the first display interface.

In this way, with the display method according to the embodiments of the present disclosure, the electronic device is capable of, based on the fourth operation, editing at least one launch entry of at least one application displayed in the first region, and enables quick split-screen display in combination with the actions at block S101 and block S102. For example, when the first region displays the at least one launch entry of the at least one application, and the second region displays the display interface of the second application, a launch entry of a target application can be adjusted to the first position in the first region based on the fourth operation, and the proportion of the first region can be adjusted based on the first operation to display the target application and the second application in the first display interface, improving the screen splitting efficiency. Also, when the at least one launch entry of the at least one application in the first region is associated with the application, the electronic device can further close the application corresponding to the fourth operation in the background based on the fourth operation, preventing undesired data transmissions from taking up processing resources of the electronic device.

In some embodiments, on the basis of the actions at block S101 and at block S102 and the actions at block S201 and at block S202, the method further includes actions at block S205 and at block S206.

Figure 14:
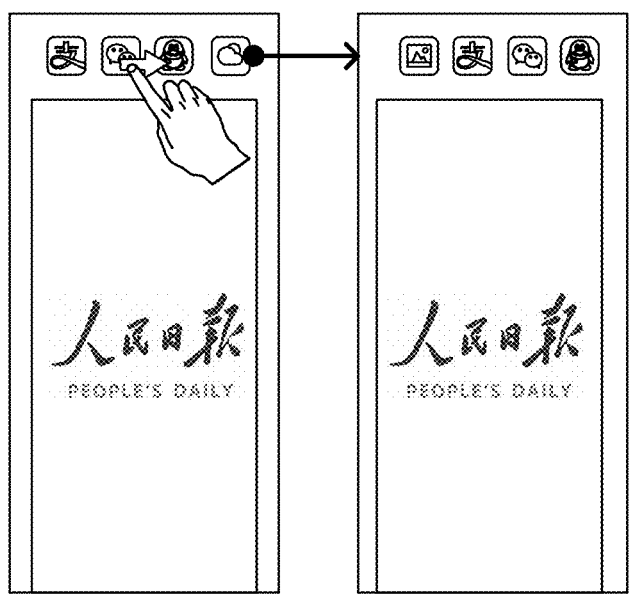
FIG. 14 is an optional schematic display diagram of an electronic device in response to a fifth operation according to an embodiment of the present disclosure.
Figure 15:
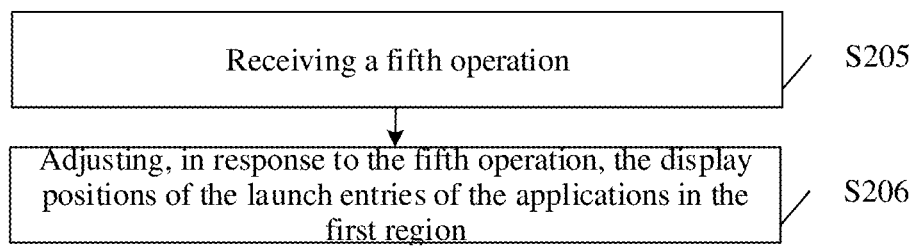
FIG. 15 is a fourth optional flowchart of a display method according to an embodiment of the present disclosure.

FIG. 14 illustrates an optional schematic display diagram of an electronic device in response to a fifth operation according to an embodiment of the present disclosure. FIG. 15 illustrates a fourth optional flowchart of a display method according to an embodiment of the present disclosure. Description will be made in conjunction with FIG. 14 and FIG. 15.

At block S205, a fifth operation is received.

In some embodiments, an action of receiving, by the electronic device, the fifth operation includes detecting and/or recognizing, by the electronic device, the fifth operation with respect to the screen of the electronic device. The fifth operation is used to adjust display positions of launch entries of applications in the first region, when the proportion of the first region is smaller than or equal to the first threshold, and when the number of applications run by the electronic device in the first time period is greater than the first number.

In some embodiments, the fifth operation may include swiping to the left and/or swiping to the right in the first region.

At block S206, the display positions of the launch entries of the applications in the first region are adjusted in response to the fifth action.

In some embodiments, that "the fifth operation is used to adjust display positions of launch entries of applications in the first region, when the proportion of the first region is smaller than or equal to the first threshold, and when the number of applications run by the electronic device in the first time period is greater than the first number" includes: adjusting, in response to the fifth operation, the display positions of the launch entries of the applications in the first region. The operation for adjusting the display positions performed on the launch entries of the applications in the first region through the fifth operation does not affect the normal display of the main interface or the display interface of the application in the second region. That is, no matter how the launch entries of the applications are adjusted through the fifth operation, the second region keeps displaying the display interface of the second region as it was before reception of the fifth operation, without changing displayed content due to the fifth operation.

In some embodiments, the action of adjusting, by the electronic device, the display positions of the launch entries of the applications in the first region includes adjusting the display positions of the launch entries of the applications in the first region sequentially based on a sequence of the one or more launch entries of the first number of applications run by the electronic device in the first time period.

As illustrated in FIG. 14, when the number of applications run by the electronic device in the first time period is greater than the first number, e.g., four, applications used by the electronic device in the first time period are, if sequenced in order of last used time, application A, application B, application C, application D, application E, application F, application G, and application H, and the launch entry of application A, the launch entry of application B, the launch entry of application C, and the launch entry of application D are displayed sequentially in the first region. In response to the fifth operation, positions of the launch entry of application B, the launch entry of application C, and the launch entry of application D are adjusted, and the launch entry of application E is displayed at the third position in the first region of the first display interface.

In this way, with the display method according to the embodiments of the present disclosure, the electronic device is capable of, based on the fourth operation and the fifth operation, editing at least one launch entry of at least one application displayed in the first region, and enables quick split-screen display in combination with the actions at block S101 and block S102. For example, when the first region displays the at least one launch entry of the at least one application and the second region displays the display interface of the second application, at least one display position of the at least one launch entry of the at least one application in the first region can be adjusted based on the fifth operation, the launch entry of the target application can be adjusted to the first position in the first region in combination with the fourth operation, and the proportion of the first region can be adjusted based on the first operation to display the target application and the second application within the first display interface, improving the screen splitting efficiency.

In some embodiments, on the basis of the actions at block S101 and block S102 and the actions at block S201 and block S202, the method further includes actions at block S207 to block S210.

Figure 16:
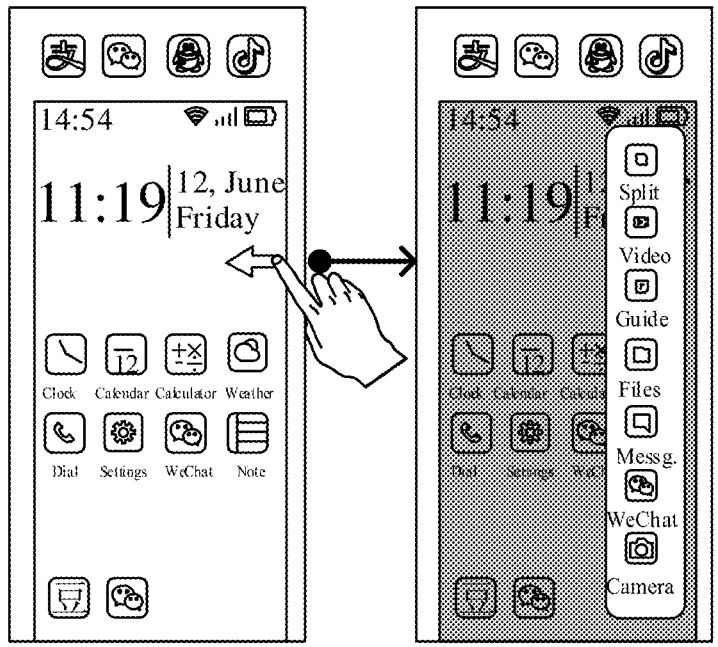
FIG. 16 is an optional schematic display diagram of an electronic device in response to a sixth operation according to an embodiment of the present disclosure.
Figure 17:
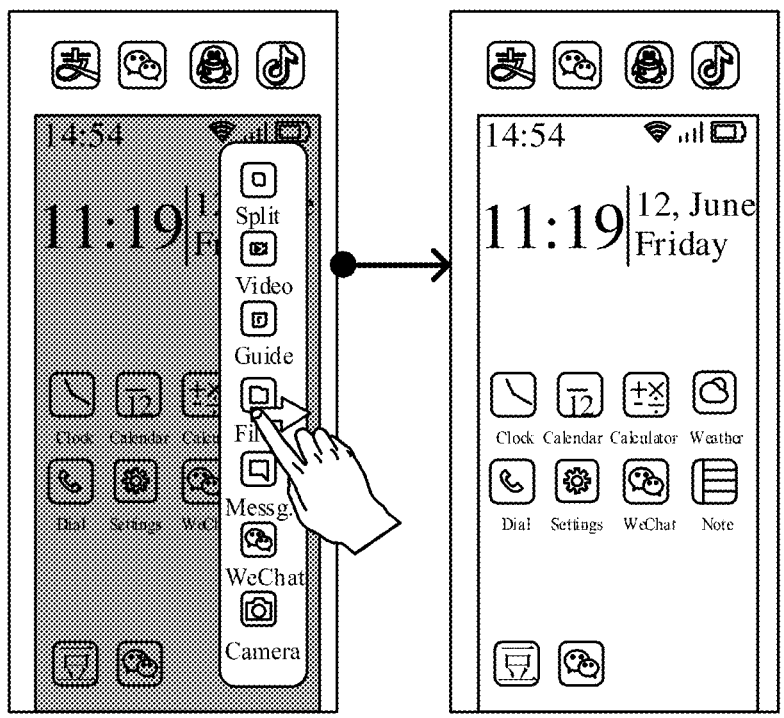
FIG. 17 is an optional schematic display diagram of an electronic device in response to a seventh operation according to an embodiment of the present disclosure.
Figure 18:
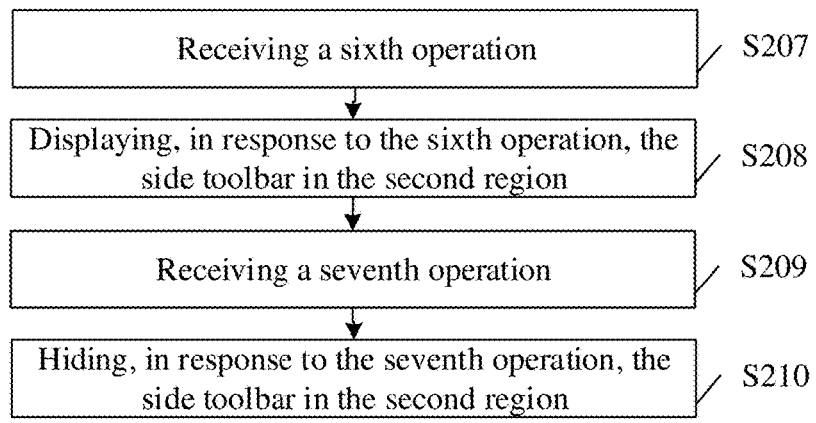
FIG. 18 is a fifth optional flowchart of a display method according to an embodiment of the present disclosure.

FIG. 16 illustrates an optional schematic display diagram of an electronic device in response to a sixth operation according to an embodiment of the present disclosure. FIG. 17 is an optional schematic display diagram of an electronic device in response to a seventh operation according to an embodiment of the present disclosure. FIG. 18 is a fifth optional flowchart of a display method according to an embodiment of the present disclosure. Description will be made in conjunction with FIG. 16, FIG. 17, and FIG. 18.

At block S207, a sixth operation is received.

In some embodiments, an action of receiving, by the electronic device, the sixth operation includes detecting and/or recognizing, by the electronic device, the sixth operation with respect to the screen of the electronic device. The sixth operation is used to display a side toolbar in the second region, when the proportion of the first region is smaller than or equal to the first threshold, and when the second region displays the one or more launch entries of all of the one or more applications included in the second display interface minified by the first scale.

In some embodiments, the sixth operation may include swiping to the left from a rightmost side of the screen of the electronic device and releasing.

At block S208, the side toolbar is displayed, in response to the sixth operation, in the second region.

In some embodiments, when the proportion of the first region is smaller than or equal to the first threshold, and the second region displays the one or more launch entries of all of the one or more applications included in the second display interface minified by the first scale, the electronic device displays, in response to the sixth operation, the side toolbar in the second region.

As illustrated in FIG. 16, the screen of the electronic displays the first display interface and the proportion of the first region is smaller than or equal to the first threshold. The second region displays the launch entries of all applications included in the second display interface minified by the first scale. The side toolbar is displayed, in response to the sixth operation, in the second region.

At block S209, a seventh operation is received.

In some embodiments, an action of receiving, by the electronic device, the seventh operation includes detecting and/or recognizing, by the electronic device, the seventh operation with respect to the screen of the electronic device. The seventh operation is used to hide the side toolbar when the side toolbar is displayed in the second region.

In some embodiments, the seventh operation may include swiping to the right in a display region of the side toolbar and releasing, when the side toolbar is displayed near a right frame of the screen of the electronic device.

At block S210, the side toolbar is hidden, in response to the seventh operation, in the second region.

In some embodiments, the seventh operation is used to hide the side toolbar when the side toolbar is displayed in the second region.

As illustrated in a left image of FIG. 17, the second region of the electronic device displays the side toolbar, and the side toolbar is hidden, in response to the seventh operation, in the second region.

In this way, with the display method according to the embodiments of the present disclosure, the electronic device can display or hide the side toolbar in the second region based on the sixth operation and the seventh operation, allowing quick operations to be realized subsequently based on an operation on the side toolbar, and improving efficiency of data processing under the first display interface.

In some embodiments, on the basis of the actions at block S101 and block S102 and actions at block S201 to S210, the method further includes actions at block S211 and block S212.

Figure 19:
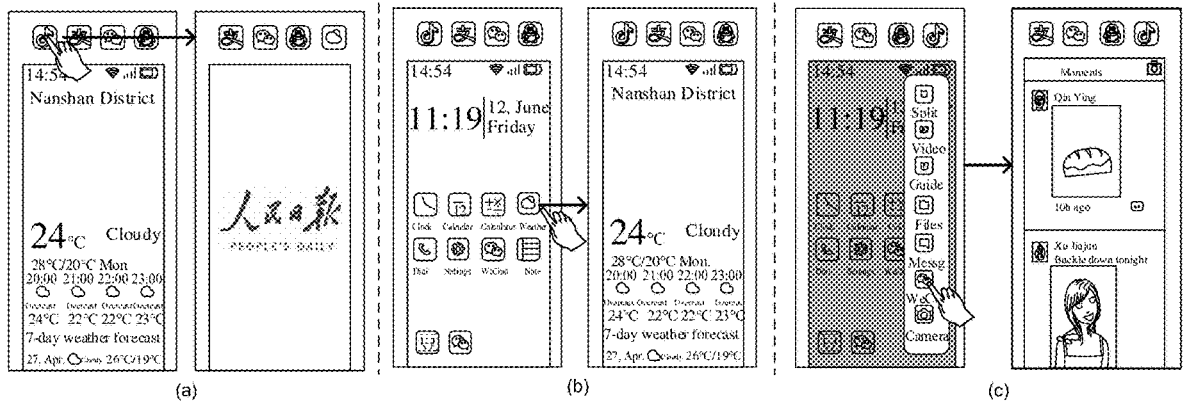
FIG. 19 is three optional schematic display diagrams of an electronic device in response to a eighth operation according to an embodiment of the present disclosure.
Figure 20:
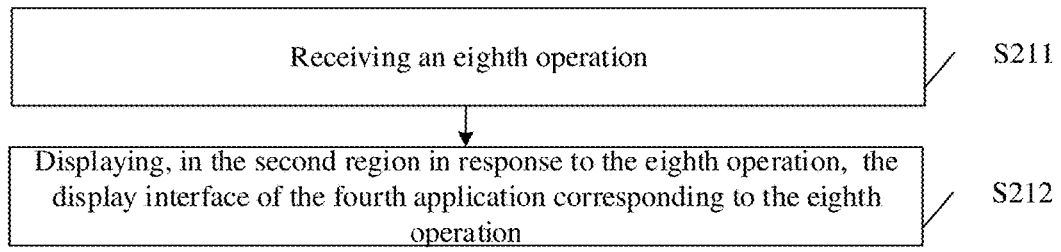
FIG. 20 is a sixth optional flowchart of a display method according to an embodiment of the present disclosure.

FIG. 19 illustrates three optional schematic display diagrams of an electronic device in response to an eighth operation according to an embodiment of the present disclosure. FIG. 20 is a sixth optional flowchart of a display method according to an embodiment of the present disclosure. Description will be made in conjunction with FIG. 19 and FIG. 20.

At block S211, an eighth operation is received.

In some embodiments, an action of receiving, by the electronic device, the eighth operation includes detecting and/or recognizing, by the electronic device, the eighth operation with respect to the screen of the electronic device. The eighth operation is used to display in the second region a display interface of a fourth application corresponding to the eighth operation, when the proportion of the first region is smaller than or equal to the first threshold.

In some embodiments, the fourth application includes: an application corresponding to a launch entry of any application displayed in the first region; or an application corresponding to a launch entry of any application included in the second display interface minified by the first scale and displayed in the second region; or an application corresponding to a launch entry of any application included in the side toolbar.

Further, the eighth operation may be an operation on the first region when the fourth application is the application corresponding to the launch entry of any application displayed in the first region; the eighth operation may be an operation on the second region when the fourth application is the application corresponding to the launch entry of any application included in the second display interface minified by the first scale and displayed in the second region; and the eighth operation is an operation on the side toolbar when the fourth application is the application corresponding to the launch entry of any application included in the side toolbar.

In some embodiments, the eighth operation may be a click operation.

At block S212, the display interface of the fourth application corresponding to the eighth operation is displayed, in response to the eighth operation, in the second region.

In some embodiments, an action performed by the electronic device in response to the eighth operation, when the fourth application is the application corresponding to the launch entry of any application displayed in the first region, includes: displaying the fourth application in the second region, when an interface of the second application is displayed in the second region before the eighth operation is received; and displaying the launch entry of the second application at the first position of the first region, and adjusting at least one display position of at least one other application in the first region. As illustrated in FIG. 19(*a*), a weather application is displayed in the second region before reception of the eighth operation. The display interface of the fourth application is displayed, in response to the eighth operation, in the second region. A launch entry of the weather application is added at the first position of the first region. Also, display positions of launch entries of other applications are adjusted.

In some embodiments, the action performed by the electronic device in response to the eighth operation, when the fourth application is the application corresponding to the launch entry of any application displayed in the first region, includes: displaying, in the second display interface, the display interface of the fourth application, when the second region displays a launch entry of each application included in the second display interface before the eighth operation is received.

In some embodiments, as illustrated in FIG. 19(*b*), an action performed by the electronic device in response to the eighth operation, when the fourth application is the application corresponding to the launch entry of any application included in the second display interface minified by the first scale and displayed in the second region, includes: displaying the display interface of the fourth application in the second display interface.

In some embodiments, as illustrated in FIG. 19(*c*), an action performed by the electronic device in response to the eighth operation, when the fourth application is the application corresponding to the launch entry of any application included in the side toolbar, includes: displaying the display interface of the fourth application in the second display interface, and/or hiding the side toolbar.

In this way, with the display method according to the embodiments of the present disclosure, the electronic device displays the first display interface based on the second operation and displays the fourth application in the second region based on the eighth operation, achieving switch between display interfaces of applications. In addition, on the basis of its split-screen display, the electronic device can display, in the first region based on the first operation, the at least one launch entry of the at least one application; adjust the launch entry of the target application to the first position in the first region in combination with the fourth operation and the fifth operation; and adjust the proportion of the first region based on the first operation, achieving display of the target application and the fourth application in the first display interface, and improving efficiency of application switching in a split-screen state.

In some embodiments, on the basis of the actions at block S101 and block S102 and actions at block S201 to block S212, the method further includes actions at block S213 and block S214.

Figure 21:
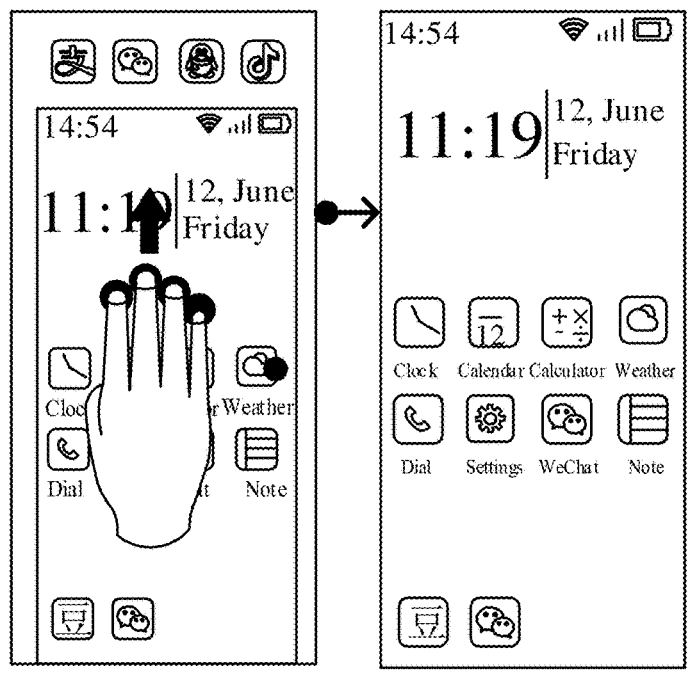
FIG. 21 is an optional schematic display diagram of an electronic device in response to a ninth operation according to an embodiment of the present disclosure.
Figure 22:
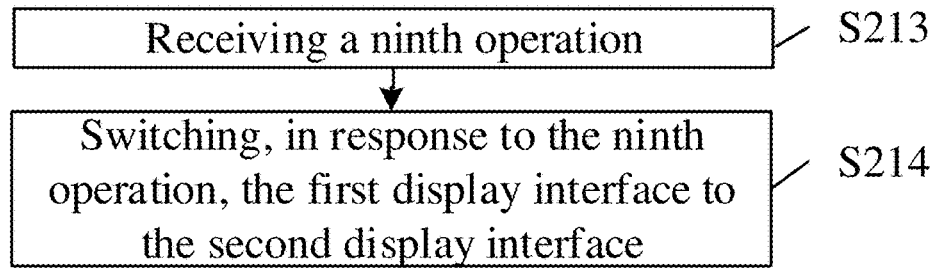
FIG. 22 is a seventh optional flowchart of a display method according to an embodiment of the present disclosure.

FIG. 21 illustrates an optional schematic display diagram of an electronic device in response to a ninth operation according to an embodiment of the present disclosure. FIG. 22 illustrates a seventh optional flowchart of a display method according to an embodiment of the present disclosure. Description will be made in conjunction with FIG. 21 and FIG. 22.

At block S213, a ninth operation is received.

In some embodiments, an action of receiving, by the electronic device, the ninth operation includes detecting and/or recognizing, by the electronic device, the ninth operation with respect to the screen of the electronic device, when the proportion of the first region is smaller than or equal to the first threshold, and when the second region displays the launch entry of each application included in the second display interface minified by the first scale. The ninth operation is used to switch the first display interface to the second display interface.

In some embodiments, the ninth operation may include any of swiping down with four fingers, a five-finger release operation on the screen, three consecutive taps, swiping down with two fingers, or the like.

At block S214, the first display interface is switched, in response to the ninth operation, to the second display interface.

In some embodiments, as illustrated in FIG. 21, when the proportion of the first region is smaller than or equal to the first threshold, and the second region displays the launch entry of each application included in the second display interface minified by the first scale, the electronic device switches, in response to the ninth operation, the first display interface to the second display interface.

In this way, with the display method according to the embodiments of the present disclosure, the electronic device can switch the first display interface to the second display interface based on the ninth operation, to perform subsequent operations requiring no screen splitting.

In some embodiments, on the basis of the actions at block S101 and block S102 and the actions at block S201 and block S202, the method further includes actions at block S215 and block S216.

Figure 23:
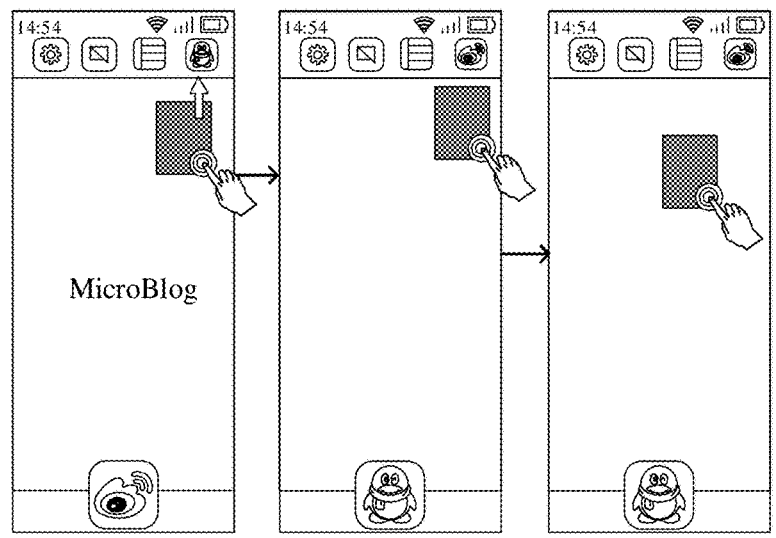
FIG. 23 is an optional schematic display diagram of an electronic device in response to a third operation according to an embodiment of the present disclosure.
Figure 24:
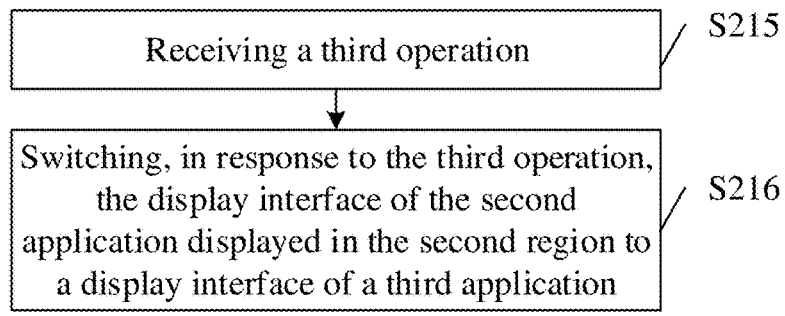
FIG. 24 is an eighth optional flowchart of a display method according to an embodiment of the present disclosure.

FIG. 23 illustrates a schematic diagram of a response to a third operation according to an embodiment of the present disclosure. FIG. 24 illustrates an eighth optional flowchart of a display method according to an embodiment of the present disclosure. Description will be made in conjunction with FIG. 23 and FIG. 24.

At block S215, a third operation is received.

In some embodiments, an action of receiving, by the electronic device, the third operation includes detecting and/or recognizing, by the electronic device, the third operation with respect to the screen of the electronic device, when the proportion of the first region is smaller than or equal to the first threshold, and when the second region displays the display interface of the second application. The third operation is used to select first information in the display interface of the second application.

At block S216, the display interface of the second application displayed in the second region is switched, in response to the third operation, to a display interface of a third application.

In some embodiments, as illustrated in FIG. 23, an action performed by the electronic device in response to the third operation includes: switching the display interface of the second application displayed in the second region to the display interface of the third application; and displaying the first information in the display interface of the third application.

In some embodiments, the third operation may include: selecting the first information by means of a long press, a short press, or drawing a circle in the display region of the first information; dragging the first information to a launch entry of the third application; and dragging the first information to the display interface of the third application and releasing the first information.

In this way, with the display method according to the embodiments of the present disclosure, the electronic device can share the first information in the second application directly to the third application based on the third operation to enable efficient information sharing between applications, without performing complex operations in the related art of clicking a specific button of the second application, selecting the third application, and confirming display of the third application in the second region.

In some embodiments, the method further includes actions at block S301 and block S302 before the action at block S101.

Figure 25:
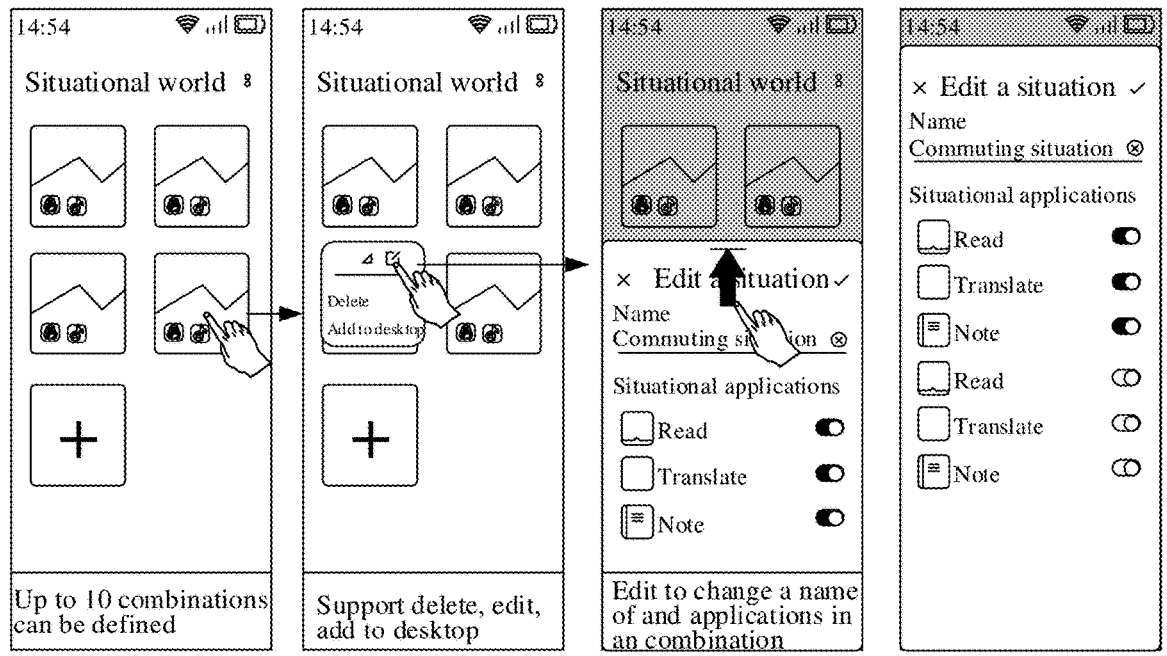
FIG. 25 is an optional schematic diagram of setting a situational mode according to an embodiment of the present disclosure.
Figure 26:
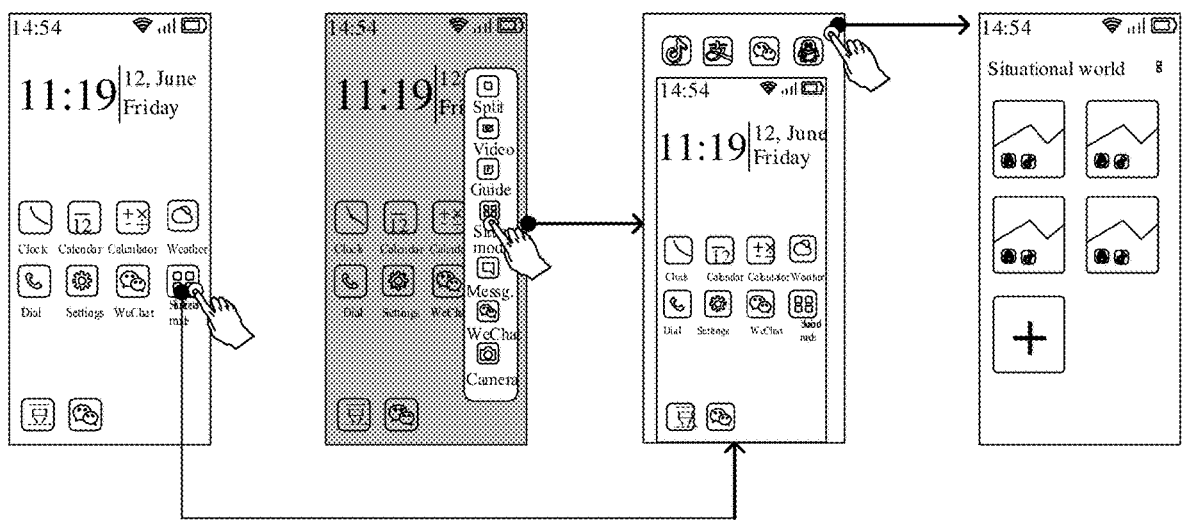
FIG. 26 is an optional schematic diagram of establishing a shortcut to a situational mode according to an embodiment of the present disclosure.
Figure 27:
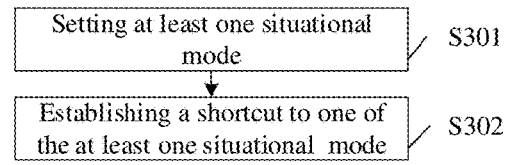
FIG. 27 is a ninth optional flowchart of a display method according to an embodiment of the present disclosure.

FIG. 25 illustrates an optional schematic diagram of setting a situational mode according to an embodiment of the present disclosure. FIG. 26 illustrates an optional schematic diagram of establishing a shortcut to a situational mode according to an embodiment of the present disclosure. FIG. 27 illustrates a ninth optional flowchart of a display method according to an embodiment of the present disclosure. Description will be made in conjunction with FIG. 25, FIG. 26, and FIG. 27.

At block S301, at least one situational mode is set.

In some embodiments, each of the at least one situational mode is used to indicate a launch entry of an application displayed in the first region when the proportion of the first region is smaller than or equal to the first threshold.

In some embodiments, an action of setting, by the electronic device, the at least one situational mode includes setting, by the electronic device, one or more applications displayed in the first region of the first display interface, the number of the applications being smaller than or equal to a second number. The second number may be predetermined by the electronic device. The number of the set situational modes does not exceed a third number. The at least one situational mode is set based on different combinations of the one or more applications in the number smaller than or equal to the second number. Applications corresponding to different situational modes are not exactly the same.

In some embodiments, the method further includes managing, by the electronic device, the set at least one situational mode. The action of managing, by the electronic device, the set at least one situational mode includes: deleting, by the electronic device, any situational mode; and/or adding, by the electronic device, a launch entry of any situational mode to a third region. The third region may be the second display interface or the side toolbar.

In some other embodiments, the method further includes editing, by the electronic device, the set at least one situational mode. The action of editing, by the electronic device, the set at least one situational mode includes: setting, by the electronic device, a name of any situational mode; and/or changing, by the electronic device, an application corresponding to the at least one situational mode.

As illustrated in FIG. 25, in a case of setting at least one situational mode through determining the second number of applications, the electronic device can manage the set at least one situational mode by means of an operation, e.g., deleting any situational mode, or adding the launch entry of any situational mode to the third region; and can further edit the set at least one situational mode by means of an operation, e.g., editing the name of any situational mode and/or changing an application corresponding to any situational mode.

At block S302, a shortcut to one of the at least one situational mode is established.

In some embodiments, the shortcut is used to activate the one of the at least one situational mode.

In some embodiments, an action of establishing, by the electronic device, the shortcut to the situational mode includes: adding, by the electronic device, a launch entry of the situational mode to the third region; and activating the situational mode based on an operation for the launch entry of the situational mode.

The third region may include the second display interface or the side toolbar.

As illustrated in FIG. 26, after the launch entry of the situational mode is added to the third region, the situational mode may be activated by an operation that is based on the launch entry of the situational mode.

In this way, with the display method according to the embodiments of the present disclosure, demands for applications in different scenarios can be satisfied by setting the at least one situational mode. For example, a situational mode for commuting can be set, with applications corresponding to such a situational mode being applications commonly used in commuting, to satisfy a split-screen operation or an information sharing operation in a commuting scenario, thus avoiding complex operations of adjusting, by means of the fourth operation or the fifth operation when no situational mode is set, the launch entry of each application displayed in the first region.

Figure 28:
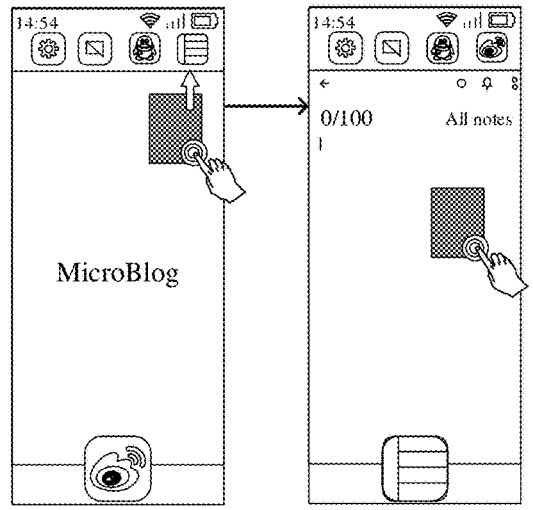
FIG. 28 is a first optional schematic display diagram of an electronic device for sharing content between applications according to an embodiment of the present disclosure.
Figure 29:
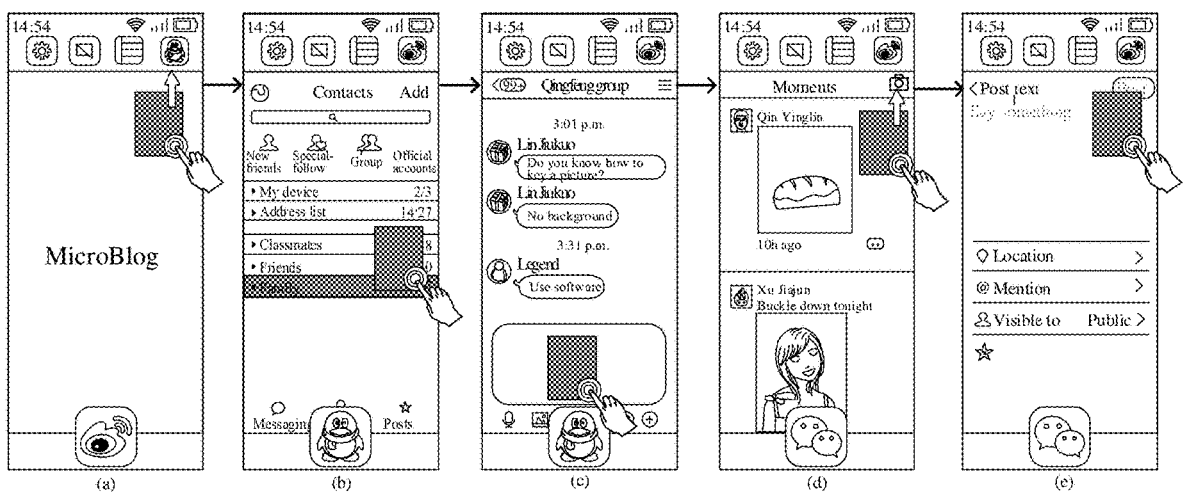
FIG. 29 is a second optional schematic display diagram of an electronic device for sharing content between applications according to an embodiment of the present disclosure.
Figure 30:
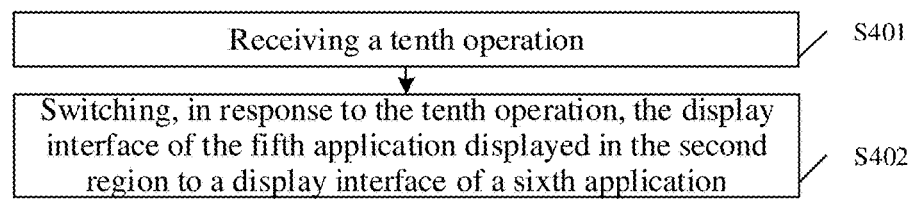
FIG. 30 is a tenth optional flowchart of a display method according to an embodiment of the present disclosure.

FIG. 28 illustrates a first optional schematic display diagram of an electronic device for sharing content between applications according to an embodiment of the present disclosure. FIG. 29 illustrates a second optional schematic display diagram of an electronic device for sharing content between applications according to an embodiment of the present disclosure. FIG. 30 illustrates a tenth optional flowchart of a display method according to an embodiment of the present disclosure. Description will be made based on individual actions.

At block S401, a tenth operation is received.

In some embodiments, the tenth operation is used to select second information in the first display interface of the electronic device. The second information is information in a display interface of a fifth application displayed in the second region of the first display interface.

In some embodiments, the method further includes, before reception of the tenth operation: receiving an eleventh operation; and responding to the eleventh operation. A specific process of receiving the eleventh operation is identical to the process in step S201 of receiving the second operation, the action of responding to the eleventh operation is identical to the process in step S202 of responding to the second operation, and thus details thereof will be omitted here.

In some embodiments, the method further includes, before the reception of the tenth operation and after a response to the eleventh operation: receiving a twelfth operation; displaying, in the second region in response to the twelfth operation, the display interface of the fifth application corresponding to the twelfth operation. A specific process of receiving the twelfth operation is identical to the process in step S211 of receiving the eighth operation, the action of responding to the twelfth operation is identical to the process in step S212 of responding to the eighth operation, and thus details thereof will be omitted here.

After a response to the twelfth operation, the second region displays the display interface of the fifth application corresponding to the twelfth operation. The action of receiving the tenth operation includes detecting and/or recognizing, by the electronic device, the tenth operation with respect to the screen of the electronic device. The tenth operation is used to select the second information in the display interface of the fifth application.

At block S402, the display interface of the fifth application displayed in the second region is switched, in response to the tenth operation, to a display interface of a sixth application.

In some embodiments, an action made in response to the tenth operation includes: switching, based on the tenth operation, the display interface of the fifth application displayed in the second region to the display interface of the sixth application. Before the reception of the tenth operation, a launch entry of the sixth application is displayed in the first region of the first display interface. After a response to the tenth operation, the second information is displayed in the display interface of the sixth application.

In some embodiments, the action made in response to the tenth operation specifically includes: selecting the second information in the display interface of the fifth application; determining the launch entry of the sixth application corresponding to a first target position of the second information based on the tenth operation; switching the display interface of the fifth application displayed in the second region to the display interface of the sixth application; and determining a second target position to which the second information moves based on the tenth operation, and displaying the second information in the display interface of the sixth application.

In some embodiments, the action of displaying the second information in the display interface of the sixth application includes: displaying the second information in a content editing region of the sixth application when the sixth application is a first-class application; or when the sixth application is a second-class application, displaying a contacts list included in the sixth application, opening a chat box with a first contact corresponding to the second target position based on the tenth operation, and displaying the second information in an input region of the chat box; or when the sixth application is the second-class application, displaying a publishing region included in the sixth application, and displaying the second information in the publishing region.

In some embodiments, the first-class application may include a text editing application, an image editing application, a table editing application, and other content editing applications. The text editing applications may include memo, Word, YoudaoNote, Evernote, Suji Note, TimeDiary, and other applications that allow text editing. The image editing applications may include Meitu, memo, Photoshop, Capcut, Butter Camera, and other applications that allow image or video editing. The second-class application may include a social application. The social application is an application having a sharing function or a reception function and may include QQmail, Mail Master, QQ, WeChat, MicroBlog, Douban, TikTok, etc.

As illustrated in FIG. 28, the electronic device selects, in response to the tenth operation, the second information in the display interface of the fifth application; determines the launch entry of the sixth application corresponding to the first target position of the second information based on the tenth operation; switches the display interface of the fifth application displayed in the second region to the display interface of the sixth application when the sixth application is the first-class application; and displays the second information in the content editing region of the sixth application.

As illustrated in FIG. 29(a) to FIG. 29(c), the electronic device selects, in response to the tenth operation, the second information in the display interface of the fifth application; determines the launch entry of the sixth application corresponding to the first target position of the second information based on the tenth operation; switches the display interface of the fifth application displayed in the second region to the display interface of the sixth application, when the sixth application is the second-class application; and displays in the sixth application the contacts list included in the sixth application, opens the chat box with the first contact corresponding to the second target position based on the tenth operation, and displays the second information in the input region of the chat box.

Alternatively, as illustrated in FIG. 29(a), FIG. 29(d), and FIG. 29(e), the electronic device selects, in response to the tenth operation, the second information in the display interface of the fifth application; determines the launch entry of the sixth application corresponding to the first target position of the second information based on the tenth operation; switches the display interface of the fifth application displayed in the second region to the display interface of the sixth application; and displays in the sixth application the publishing region included in the sixth application, and displaying the second information in the publishing region.

In some embodiments, the method further includes, after a response to the tenth operation: receiving a thirteenth operation; and switching, in response to the thirteenth operation, the first display interface to the second display interface. A specific process of receiving the thirteenth operation is identical to the process in step S213 of receiving the ninth operation, a process of the action of responding to the thirteenth operation is identical to the process in step S214 of responding to the ninth operation, and thus details thereof will be omitted here.

In this way, with the display method according to the embodiments of the present disclosure, the electronic device can share the first information in the fifth application directly to the sixth application based on the third operation to enable efficient information sharing between applications, without performing complex operations in the related art of clicking a specific button of the fifth application, selecting the sixth application, and confirming display of the sixth application in the second region.

Figure 31:
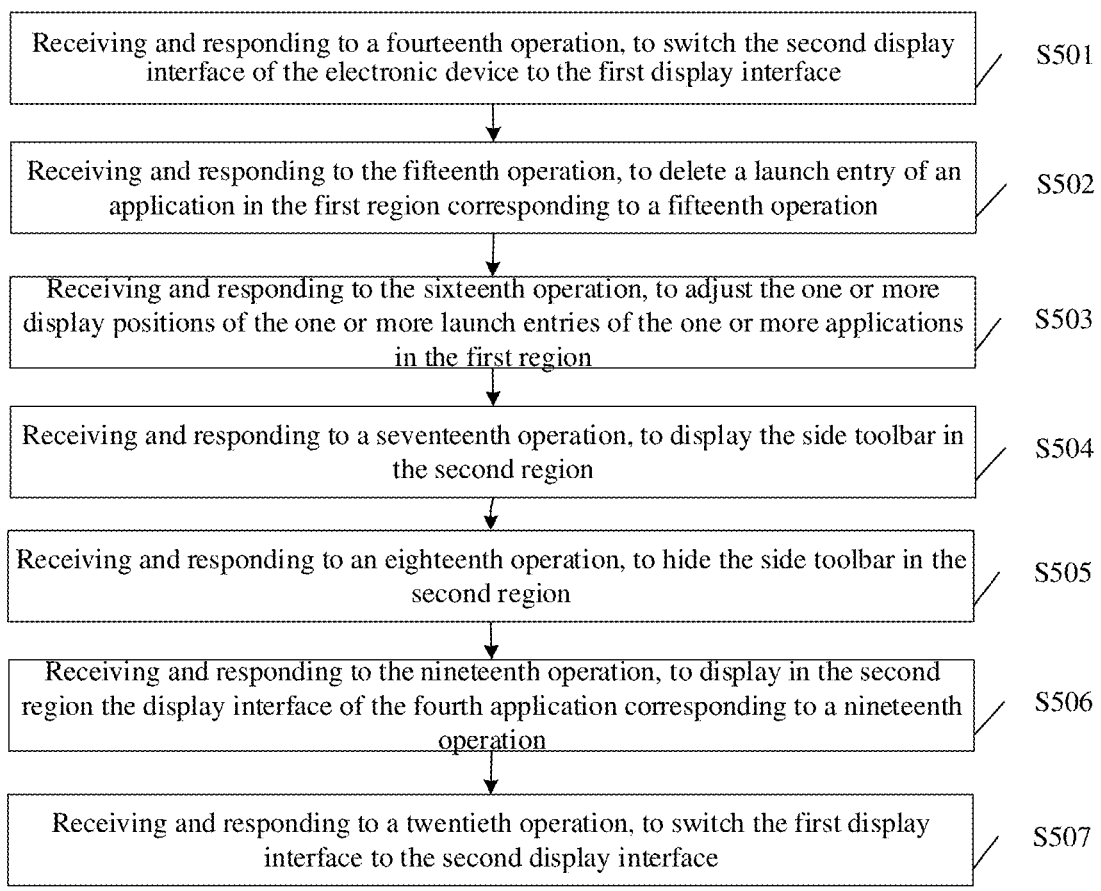
FIG. 31 is an eleventh optional flowchart of a display method according to an embodiment of the present disclosure.

FIG. 31 illustrates an eleventh optional flowchart of a display method according to an embodiment of the present disclosure, which will be described based on individual actions.

At block S501, a fourteenth operation is received and responded to, to switch the second display interface of the electronic device to the first display interface.

In some embodiments, actions of receiving and responding to, by the electronic device, the fourteenth operation include: receiving, by the electronic device, the fourteenth operation; and responding to, by the electronic device, the fourteenth operation.

In some embodiments, the action of receiving, by the electronic device, the fourteenth operation includes detecting and/or recognizing, by the electronic device, the fourteenth operation with respect to the screen of the electronic device. The fourteenth operation is used to switch the display interface of the electronic device.

In some embodiments, the action of switching the display interface of the electronic device includes switching the second display interface of the electronic device to the first display interface. The second display interface may be the main interface of the electronic device displayed based on the size of the screen of the electronic device. That is, the area size of the second display interface for displaying the main interface of the electronic device is identical to the size of the screen of the electronic device.

In some embodiments, the action of responding to, by the electronic device, the fourteenth operation includes: when the display interface of the electronic device is the first display interface, displaying in the second region of the first display interface the one or more launch entries of the one or more applications in the second display interface, and displaying in the first region of the first display interface the at least one launch entry of the at least one application. That is, the electronic device is screen-split to display the information of the electronic device in the split-screen manner. For example, the information of the main page of the electronic device and an interface of one application in the electronic device are displayed in the split-screen manner; or interfaces of two applications in the electronic device are displayed in the electronic device in the split-screen manner.

In some embodiments, the action of displaying the second display interface in the second region of the first display interface includes displaying, in the second region of the first display interface, the one or more launch entries of all of the one or more applications included in the second display interface minified by the first scale.

In some embodiments, the fourteenth operation may include any of swiping up with four fingers, the grasp operation on the screen with five fingers, three consecutive taps, or swiping up with two fingers.

At block S502, a fifteenth operation is received and responded to, to delete a launch entry of an application in the first region corresponding to the fifteenth operation.

In some embodiments, actions of receiving and responding to, by the electronic device, the fifteenth operation include: receiving, by the electronic device, the fifteenth operation; and responding to, by the electronic device, the fifteenth operation.

In some embodiments, the action of receiving, by the electronic device, the fifteenth operation includes detecting and/or recognizing, by the electronic device, the fifteenth operation with respect to the screen of the electronic device. The fifteenth operation is used to delete a launch entry of an application within the first region of the first display interface when the proportion of the first region is smaller than or equal to the first threshold.

In some embodiments, the action of responding to, by the electronic device, the fifteenth operation includes deleting, in response to the fifteenth operation, a launch entry of an application corresponding to the fifteenth operation in the first region.

In some embodiments, the fifteenth operation may include selecting a launch entry of an application, and swiping up or down and releasing the launch entry of the application.

At block S503, a sixteenth operation is received and responded to, to adjust the one or more display positions of the one or more launch entries of the one or more applications in the first region.

In some embodiments, actions of receiving and responding to, by the electronic device, the sixteenth operation include: receiving, by the electronic device, the sixteenth operation; and responding to, by the electronic device, the sixteenth operation.

In some embodiments, the action of receiving, by the electronic device, the sixteenth operation includes detecting and/or recognizing, by the electronic device, the sixteenth operation with respect to the screen of the electronic device. The sixteenth operation is used to adjust display positions of launch entries of applications in the first region, when the proportion of the first region is smaller than or equal to the first threshold, and when the number of applications run by the electronic device in the first time period is greater than the first number.

In some embodiments, the action of responding to, by the electronic device, the sixteenth operation includes that: that "the sixteenth operation is used to adjust display positions of launch entries of applications in the first region, when the proportion of the first region is smaller than or equal to the first threshold, and when the number of applications run by the electronic device in the first time period is greater than the first number" includes adjusting, in response to the sixteenth operation, the display positions of the launch entries of the applications in the first region.

In some embodiments, the action of adjusting, by the electronic device, the display positions of the launch entries of the applications in the first region includes: adjusting the display positions of the launch entries of the applications in the first region sequentially, based on the sequence of the one or more launch entries of the first number of applications run by the electronic device in the first time period.

The one or more launch entries of all of the one or more applications included in the second display interface minified by the first scale are displayed in the second region of the first display interface.

In some embodiments, the sixteenth operation may include swiping to the left and/or swiping to the right in the first region.

At block S504, a seventeenth operation is received and responded to, to display the side toolbar in the second region.

In some embodiments, actions of receiving and responding to, by the electronic device, the seventeenth operation include: receiving, by the electronic device, the seventeenth operation; and responding to, by the electronic device, the seventeenth operation.

In some embodiments, the action of receiving, by the electronic device, the seventeenth operation includes detecting and/or recognizing, by the electronic device, the seventeenth operation with respect to the screen of the electronic device. The seventeenth operation is used to display the side toolbar in the second region, when the proportion of the first region is smaller than or equal to the first threshold, and when the second region displays the one or more launch entries of all of the one or more applications included in the second display interface minified by the first scale.

In some embodiments, when the proportion of the first region is smaller than or equal to the first threshold, and the second region displays the one or more launch entries of all of the one or more applications included in the second display interface minified by the first scale, the electronic device displays, in response to the seventeenth operation, the side toolbar in the second region.

In some embodiments, the seventeenth operation may include swiping to the left from a rightmost side of the screen of the electronic device and releasing.

At block S505, an eighteenth operation is received and responded to, to hide the side toolbar in the second region.

In some embodiments, actions of receiving and responding to, by the electronic device, the eighteenth operation include: receiving, by the electronic device, the eighteenth operation; and responding to, by the electronic device, the eighteenth operation.

In some embodiments, the action of receiving, by the electronic device, the eighteenth operation includes detecting and/or recognizing, by the electronic device, the eighteenth operation with respect to the screen of the electronic device. The eighteenth operation is used to hide the side toolbar when the side toolbar is displayed in the second region.

In some embodiments, the action of responding to, by the electronic device, the eighteenth operation includes that the eighteenth operation is used to hide the side toolbar when the side toolbar is displayed in the second region.

In some embodiments, the eighteenth operation may include swiping to the right in the display region of the side toolbar and releasing, when the side toolbar is displayed near the right frame of the screen of the electronic device.

At block S506, a nineteenth operation is received and responded to, to display the display interface of the fourth application corresponding to the nineteenth operation in the second region.

In some embodiments, actions of receiving and responding to, by the electronic device, the nineteenth operation include: receiving, by the electronic device, the nineteenth operation; and responding to, by the electronic device, the nineteenth operation.

In some embodiments, the action of receiving, by the electronic device, the nineteenth operation includes detecting and/or recognizing, by the electronic device, the nineteenth operation with respect to the screen of the electronic device. The nineteenth operation is used to display in the second region the display interface of the fourth application corresponding to the nineteenth operation, when the proportion of the first region is smaller than or equal to the first threshold.

In some embodiments, the fourth application includes: an application corresponding to a launch entry of any application displayed in the first region; or an application corresponding to a launch entry of any application included in the second display interface minified by the first scale and displayed in the second region; or an application corresponding to a launch entry of any application included in the side toolbar.

Further, the nineteenth operation may be an operation on the first region when the fourth application is the application corresponding to the launch entry of any application displayed in the first region; the nineteenth operation may be an operation on the second region when the fourth application is the application corresponding to the launch entry of any application included in the second display interface minified by the first scale and displayed in the second region; and the fourth application is an operation on the side toolbar when the fourth application is the application corresponding to the launch entry of any application included in the side toolbar.

In some embodiments, the action of responding to, by the electronic device, the nineteenth operation, when the fourth application is the application corresponding to the launch entry of any application displayed in the first region, includes: displaying the fourth application in the second region, when the interface of the second application is displayed in the second region before the nineteenth operation is received; and displaying the launch entry of the second application at the first position of the first region, and adjusting at least one display position of at least one other application in the first region.

In some embodiments, the action of responding to, by the electronic device, the nineteenth operation, when the fourth application is the application corresponding to the launch entry of any application displayed in the first region, includes: displaying, in the second display interface, the display interface of the fourth application, when the second region displays a launch entry of each application included in the second display interface before the nineteenth operation is received.

In some embodiments, the nineteenth operation may be a click operation.

At block S507, a twentieth operation is received and responded to, to switch the first display interface to the second display interface.

In some embodiments, actions of receiving and responding to, by the electronic device, the twentieth operation include: receiving, by the electronic device, the twentieth operation; and responding to, by the electronic device, the twentieth operation.

In some embodiments, the action of receiving, by the electronic device, the twentieth operation includes detecting and/or recognizing, by the electronic device, the twentieth operation with respect to the screen of the electronic device, when the proportion of the first region is smaller than or equal to the first threshold, and when the second region displays the launch entry of each application included in the second display interface minified by the first scale. The twentieth operation is used to switch the first display interface to the second display interface.

In some embodiments, when the proportion of the first region is smaller than or equal to the first threshold, and the second region displays the launch entry of each application included in the second display interface minified by the first scale, the electronic device switches, in response to the twentieth operation, the first display interface to the second display interface.

In some embodiments, the twentieth operation may include any of swiping down with four fingers, a five-finger release operation on the screen, three consecutive taps, swiping down with two fingers, or the like.

In this way, with the display method according to the embodiments of the present disclosure, the electronic device is capable of switching from the second display interface to the first display interface based on the fourteenth operation; and editing the at least one launch entry of the at least one application displayed in the first region based on the fifteenth operation. When the at least one launch entry of the at least one application in the first region is associated with the application, the electronic device can further close the application corresponding to the fifteenth operation in the background based on the fifteenth operation, preventing undesired data transmissions from taking up processing resources of the electronic device. The electronic device can further adjust the one or more display positions of the one or more launch entries of the one or more applications in the first region based on the sixteenth operation, and realize the editing of the at least one launch entry of the at least one application displayed in the first region in combination with the fifteenth operation. In combination with the seventeenth operation and the eighteenth operation, the electronic device can further display the side toolbar in the second region or hide the side toolbar, allowing quick operations to be realized subsequently based on an operation on the side toolbar, and improving efficiency of data processing under the first display interface. The electronic device displays the first display interface based on the fourteenth operation and displays the fourth application in the second region based on the nineteenth operation, achieving switch between display interfaces of applications. The electronic device can switch the first display interface to the second display interface based on the twentieth operation, to perform subsequent operations requiring no screen splitting.

Figure 32:
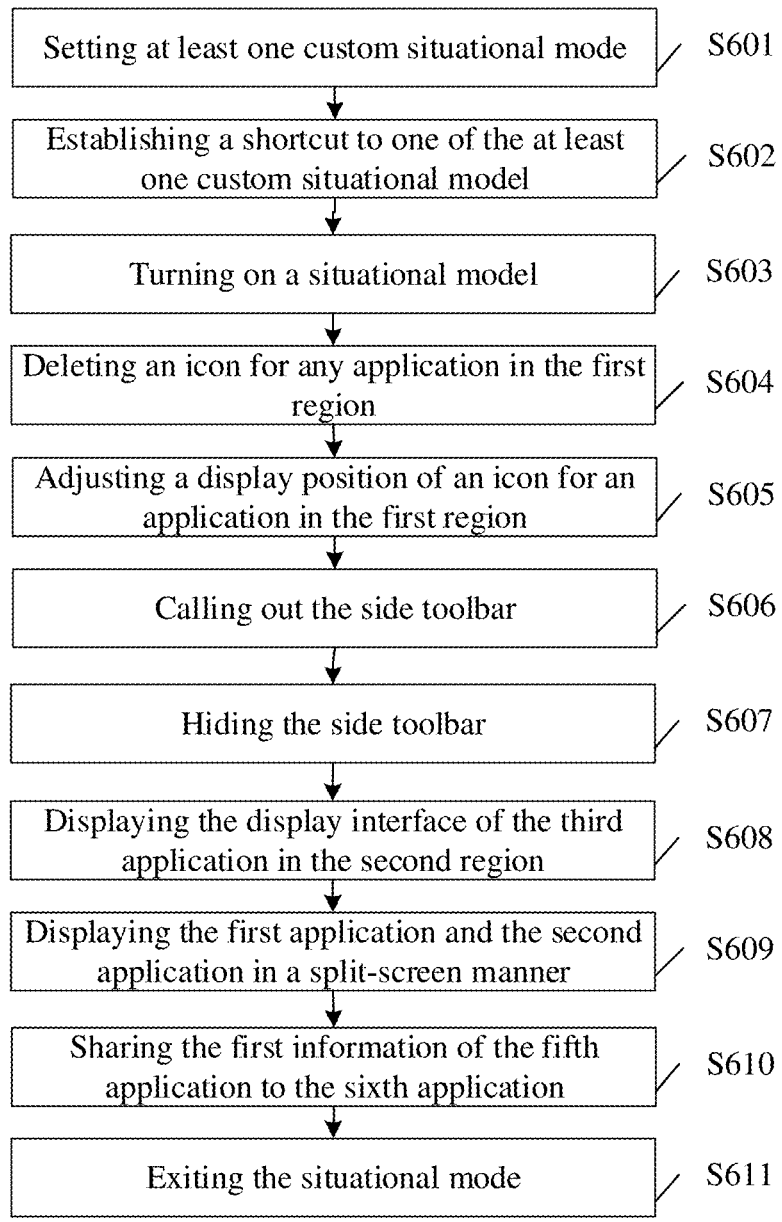
FIG. 32 is a twelfth optional flowchart of a display method according to an embodiment of the present disclosure.

FIG. 32 illustrates a twelfth optional flowchart of a display method according to an embodiment of the present disclosure, which will be described based on individual actions.

At block S601, at least one custom situational mode is set.

In some embodiments, the at least one custom situational mode is used to indicate a launch entry of an application displayed in the first region when the proportion of the first region of the first display interface is smaller than or equal to the first threshold.

In some embodiments, an action of setting, by the electronic device, the at least one custom situational mode includes setting, by the electronic device, one or more applications displayed in the first region of the first display interface, the number of the applications being smaller than or equal to the second number. The second number may be predetermined by the electronic device. The number of the set custom situational modes does not exceed a third number. The at least one custom situational mode is set based on different combinations of the one or more applications in the number smaller than or equal to the second number. Applications corresponding to different custom situational modes are not exactly the same.

In some embodiments, the method further includes managing, by the electronic device, the set at least one custom situational mode. The action of managing, by the electronic device, the set at least one custom situational mode includes: deleting, by the electronic device, any custom situational mode; and/or adding, by the electronic device, a launch entry of any custom situational mode to the third region. The third region may be the main interface of the electronic device or the side toolbar.

In some other embodiments, the method further includes editing, by the electronic device, the set at least one custom situational mode. The action of editing, by the electronic device, the set at least one custom situational mode includes: setting, by the electronic device, a name of any custom situational mode; and/or changing, by the electronic device, at least one application corresponding to the at least one custom situational mode.

As illustrated in FIG. 25, in a case of setting at least one custom situational mode through determining the second number of applications, the electronic device can manage the set at least one custom situational mode by means of an operation, e.g., deleting any custom situational mode, or adding the launch entry of any custom situational mode to the third region; and can further edit the set at least one custom situational mode by means of an operation, e.g., editing the name of any custom situational mode and/or changing an application corresponding to any custom situational mode.

At block S602, a shortcut to the at least one custom situational mode is established.

In some embodiments, the shortcut is used to activate the at least one custom situational mode.

In some embodiments, an action of establishing, by the electronic device, the shortcut to the at least one custom situational mode includes: adding, by the electronic device, a launch entry of any custom situational mode to the third region; and activating the at least one custom situational mode based on an operation for the at least one launch entry of the at least one custom situational mode.

The third region may include the second display interface or the side toolbar.

At block S603, a situational mode is turned on.

In some embodiments, when the situational mode is a custom situational mode, the custom situational mode is activated based on an operation for a launch entry of the custom situational mode.

In other embodiments, when the situational mode is a temporary situational mode, the temporary situational mode is turned on based on the operation of swiping down with four fingers in a case where the screen of the electronic device displays the main interface. As illustrated in FIG. 10, in the temporary situational mode, the main interface of the electronic device is switched to the first display interface. The first display interface is a display interface for the temporary situational mode. The first display interface includes the first region and the second region. The at least one launch entry of the at least one application is displayed in the first region. The main interface shrinked by the first scale is displayed in the second region. The at least one launch entry of the at least one application includes the one or more launch entries of the first number of applications run by the electronic device in the first time period.

Subsequent operations to be performed will be described by taking an example of the situational mode being the temporary situational mode. Operations of the electronic device for the custom situational mode are identical to operations of the electronic device for the temporary situational mode, except that in the custom situational mode, the first region displays only one or more launch entries of one or more applications in a number smaller than or equal to the first number, and only allows deletion of a launch entry of any application rather than adjusting a position of the launch entry of the application.

At block S604, the launch entry of any application in the first region is deleted.

As illustrated in FIG. 12, the electronic device deletes the launch entry of any application in the first region based on a manner of selecting and swiping up the launch entry of any application.

At block S605, a display position of a launch entry of an application in the first region is adjusted.

As illustrated in FIG. 14, the display position of the launch entry of the application in the first region is adjusted by an operation of swiping to the left or to the right in the first region.

At block S606, the side toolbar is called out.

As illustrated in FIG. 16, when the proportion of the first region is smaller than or equal to the first threshold, the side toolbar is called out by an operation of swiping to the left from a right side of the screen.

At block S607, the side toolbar is hidden.

As illustrated in FIG. 17, when the side toolbar is displayed in the second region of the electronic screen, the side toolbar is hidden by an operation of swiping to the right performed on the side toolbar.

At block S608, the display interface of the fourth application is displayed in the second region.

As illustrated in FIG. 19(*a*), when at least one application is displayed in the first region of the first display interface of the electronic device, the fourth application is displayed in the second region by means of the click operation performed on the launch entry of the fourth application in the first region.

As illustrated in FIG. 19(*b*), when at least one application is displayed in the first region of the first display interface of the electronic device and the second region displays the main interface minified by the first scale, the fourth application is displayed in the second region by means of the click operation performed on the launch entry of the fourth application in the second region.

As illustrated in FIG. 19(c), when the side toolbar is displayed in the second region of the first display interface of the electronic device, the fourth application is displayed in the second display region by means of the click operation performed on the launch entry of the fourth application in the side toolbar.

At block S609, the first application and the second application are displayed in a split-screen manner.

As illustrated in FIG. 7, when the first region displays the at least one launch entry of the at least one application and the second display region displays the display interface of the second application, the display interface of the first application corresponding to the launch entry located on a rightmost side of the first region can be displayed in the first region by means of an operation of swiping the screen-splitting operating rod downwards.

Further, as illustrated in FIG. 8 or FIG. 9, when the first application is displayed in the first region and the second application is displayed in the second region, it is possible to display a launch entry of a closed application at a rightmost position of the first region or the second region, by means of swiping the screen-splitting operating rod upwards or downwards to make a display proportion of the first region or the second region smaller than or equal to the first threshold.

At block S610, the first information of the fifth application is shared to the sixth application.

As illustrated in FIG. 29(a), the first information of the fifth application is selected and dragged to the launch entry of the sixth application, to display the display interface of the sixth application in the second region.

As illustrated in FIG. 29(b) and FIG. 29(c), when the sixth application is a social application, the contacts list included in the sixth application is displayed in the sixth application. The chat box with the first contact corresponding to a target position of a dragging operation for the first information is displayed. The first information is displayed in the input region of the chat box.

As illustrated in FIG. 29(d) and FIG. 29(e), when the sixth application is a social application, the publishing region included in the sixth application is displayed in the sixth application, and the first information is displayed in the publishing region.

As illustrated in FIG. 28, when the sixth application is a content editing application, the second information is displayed in the content editing region of the sixth application.

At block S611, the electronic device exits the situational mode.

As illustrated in FIG. 21, when the first region displays the at least one launch entry of the at least one application and the second region displays the main interface of the electronic device, the electronic device exits the situational mode through the operation of swiping up with four fingers.

In this way, with the display method according to the embodiments of the present disclosure, the electronic device can turn on the situational mode through swiping down with four fingers, and is capable of editing, based on an operation of selecting a launch entry and swiping the launch entry upwards or an operation of swiping to the left or to the right in the first region, the at least one launch entry of the at least one application displayed in the first region. When the at least one launch entry of the at least one application in the first region is associated with the application, the electronic device can further close the application in the background based on the operation of selecting the launch entry and swiping the launch entry upwards, preventing undesired data transmissions from taking up processing resources of the electronic device. Further, the electronic device can display the side toolbar in the second region or hide the side toolbar in combination with an operation of swiping to the left from a right side of the second region or swiping the side toolbar to the right, allowing quick operations to be realized subsequently based on an operation on the side toolbar, and improving efficiency of the data processing under the first display interface. The electronic device displays the first display interface based on an operation of dragging the screen-splitting operating rod upwards or downwards, achieving a screen splitting operation. The electronic device enables content sharing between applications based on an operation of dragging content of the application to the launch entry of the sixth application. In this way, efficient execution of operations of the electronic device can be realized through the situational mode and associated operations provided by the embodiments of the present disclosure.

Figure 33:
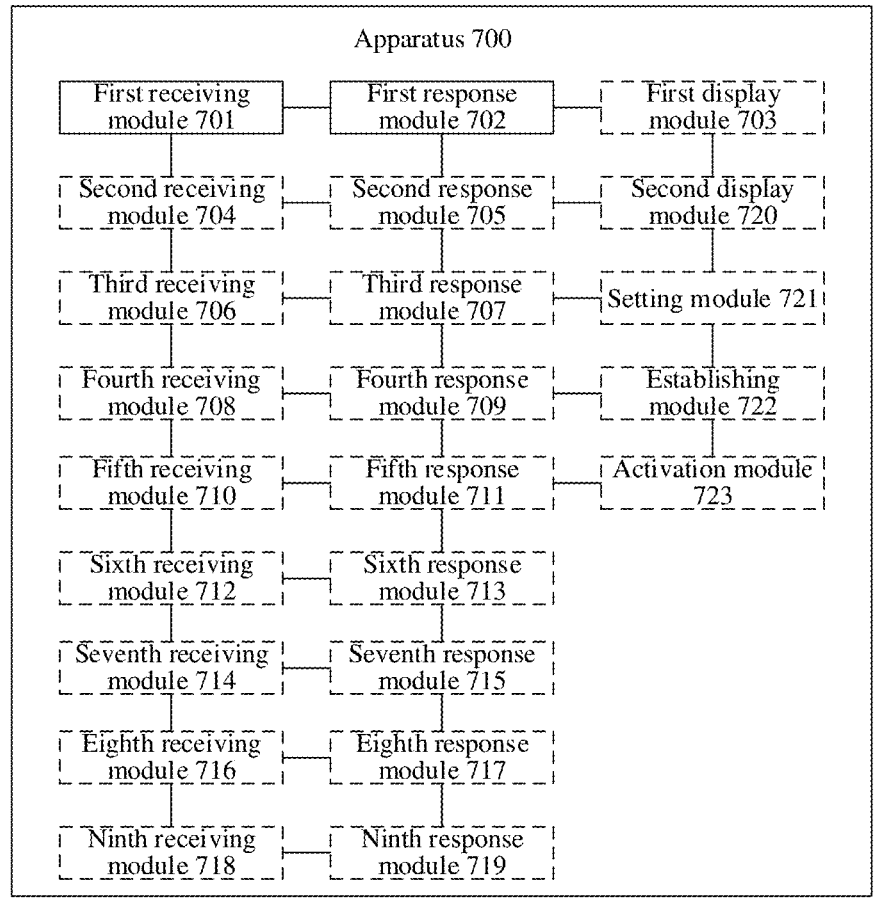
FIG. 33 is an optional schematic structural diagram of a first display apparatus according to an embodiment of the present disclosure.

FIG. 33 illustrates an optional schematic structural diagram of a first display apparatus according to an embodiment of the present disclosure, which will be described based on individual parts.

In some embodiments, an apparatus 700 includes a first receiving module 701 and a first response module 702.

The first receiving module 701 is configured to receive a first operation. The first operation is used to adjust a proportion of a first region in a first display interface of an electronic device.

The first response module 702 is configured to display, in the first region in response to the first operation, at least one launch entry of at least one application when the proportion of the first region is smaller than or equal to a first threshold, and display, in the first region in response to the first operation, a display interface of a first application in the first region when the proportion of the first region is greater than the first threshold.

In some embodiments, the apparatus further includes a first display module 703.

The first display module 703 is configured to display a display interface of a second application in a second region of the first display interface when the proportion of the first region is greater than the first threshold. The second region is completely non-overlapping with or partially overlapping with the first region.

The first display module 703 is further configured to display the at least one launch entry of the at least one application in the second region of the first display interface when the proportion of the first region is greater than the first threshold. The second region is completely non-overlapping with or partially overlapping with the first region.

In some embodiments, the at least one launch entry of the at least one application includes one or more launch entries of a first number of applications run by the electronic device in a first time period.

The first display module 703 is further configured to display a launch entry of the first application at a first position within the first region, when the proportion of the first region is switched from being greater than the first threshold to being smaller than or equal to the first threshold.

In some embodiments, the apparatus 700 further includes a second receiving module 704 and a second response module 705.

The second receiving module 704 is configured to receive a second operation before receiving the first operation.

The second response module 705 is configured to switch, in response to the second operation, a second display interface of the electronic device to the first display interface.

A second display module 720 is configured to display, in the second region of the first display interface, one or more launch entries of one or more applications in the second display interface, and display, in the first region of the first display interface, the at least one launch entry of the at least one application.

In some embodiments, the apparatus 700 further includes a third receiving module 706 and a third response module 707.

The third receiving module 706 is configured to receive a fourth operation.

The third response module 707 is configured to delete, in response to the fourth operation, a launch entry of an application corresponding to the fourth operation in the first region.

In some embodiments, the apparatus 700 further includes a fourth receiving module 708 and a fourth response module 709.

The fourth receiving module 708 is configured to receive a fifth operation.

The fourth response module 709 is configured to adjust, in response to the fifth operation, one or more display positions of one or more launch entries of one or more applications in the first region.

The second display module 720 is further configured to display, in the second region of the first display interface, the one or more launch entries of all of the one or more applications included in the second display interface minified by a first scale.

In some embodiments, the apparatus 700 further includes a fifth receiving module 710 and a fifth response module 711.

The fifth receiving module 710 is configured to receive a sixth operation after receiving the second operation.

The fifth response module 711 is configured to display, in the second region in response to the sixth operation, a side toolbar.

In some embodiments, the apparatus 700 further includes a sixth receiving module 712 and a sixth response module 713.

The sixth receiving module 712 is configured to receive a seventh operation after displaying the side toolbar in the second region.

The sixth response module 713 is configured to hide, in the second region in response to the seventh operation, the side toolbar.

In some embodiments, the apparatus 700 further includes a seventh receiving module 714 and a seventh response module 715.

The seventh receiving module 714 is configured to receive an eighth operation.

The seventh response module 715 is configured to display, in the second region in response to the eighth operation, a display interface of a fourth application corresponding to the eighth operation.

In some embodiments, the fourth application includes: an application corresponding to a launch entry of any application displayed in the first region; or an application corresponding to a launch entry of any application in the second display interface displayed in the second region; or an application corresponding to a launch entry of any application included in the side toolbar.

In some embodiments, the apparatus 700 further includes an eighth receiving module 716 and an eighth response module 717.

The eighth receiving module 716 is configured to receive a ninth operation, when the proportion of the first region is smaller than or equal to the first threshold.

The eighth response module 717 is configured to switch, in response to the ninth operation, the first display interface to the second display interface.

In some embodiments, the apparatus 700 further includes a ninth receiving module 718 and a ninth response module 719.

The ninth receiving module 718 is configured to receive a third operation. The third operation is used to select first information in a display interface of the second application.

The ninth response module 719 is configured to switch, in response to the third operation, the display interface of the second application displayed in the second region to a display interface of a third application.

The first information is displayed in the display interface of the third application.

In some embodiments, the apparatus 700 further includes a setting module 721.

The setting module 721 is configured to set at least one situational mode before receiving the first operation. Each of the at least one situational mode is used to indicate a launch entry of an application displayed in the first region when the proportion of the first region is smaller than or equal to the first threshold.

In some embodiments, the apparatus 700 further includes an establishing module 722.

The establishing module 722 is configured to establish a shortcut to one of the at least one situational mode. The shortcut is used to activate the one of the at least one situational mode.

The establishing module 722 is further configured to add a launch entry of one of the at least one situational mode in a third region.

The apparatus 700 further includes an activation module 723. The activation module 723 is configured to activate the situational mode, based on an operation performed on the launch entry of the situational mode.

Figure 34:
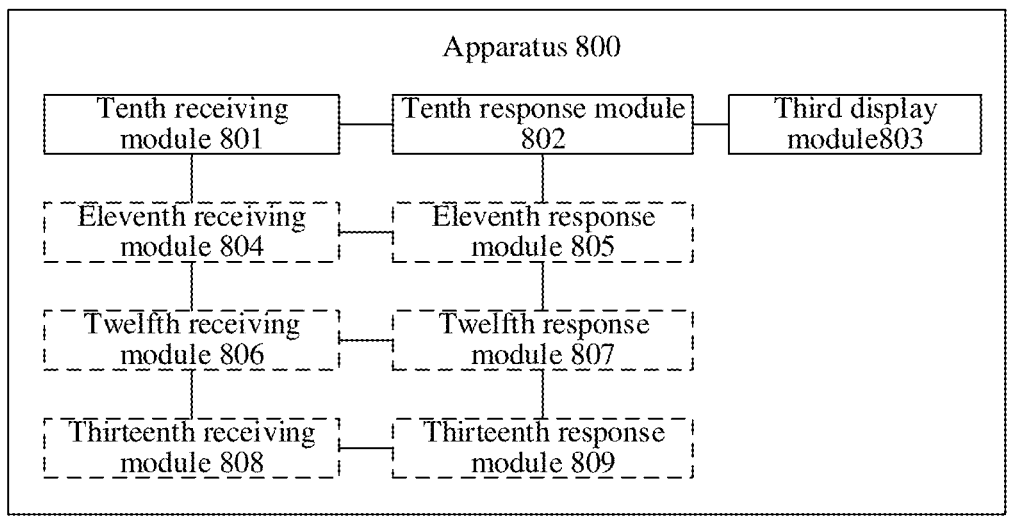
FIG. 34 is an optional schematic structural diagram of a second display apparatus according to an embodiment of the present disclosure.

FIG. 34 illustrates an optional schematic structural diagram of a second display apparatus according to an embodiment of the present disclosure, which will be described based on individual parts.

In some embodiments, an apparatus 800 includes a tenth receiving module 801, a tenth response module 802, and a third display module 803.

The tenth receiving module 801 is configured to receive a tenth operation. The tenth operation is used to select second information in a first display interface of the electronic device. The second information is information in a display interface of a fifth application displayed in a second region of the first display interface.

The tenth response module 802 is configured to switch, in response to the tenth operation, the display interface of the fifth application displayed in the second region to a display interface of a sixth application. A launch entry of the sixth application is displayed in a first region of the first display interface before receiving the tenth operation.

The third display module 803 is configured to display the second information in the display interface of the sixth application.

In some embodiments, the apparatus 800 further includes an eleventh receiving module 804 and an eleventh response module 805.

The eleventh receiving module 804 is configured to receive an eleventh operation before receiving the third operation.

The eleventh response module 805 is configured to switch, in response to the eleventh operation, a second display interface of the electronic device to the first display interface.

The third display module 803 is further configured to display, in the second region of the first display interface, one or more launch entries of one or more applications in the second display interface, and display, in the first region of the first display interface, at least one launch entry of at least one application.

In some embodiments, the apparatus 800 further includes a twelfth receiving module 806 and a twelfth response module 807.

The twelfth receiving module 806 is configured to receive a twelfth operation after a response to the eleventh operation.

The twelfth response module 807 is configured to display, in the second region in response to the twelfth operation, the display interface of the fifth application corresponding to the twelfth operation.

In some embodiments, the fifth application includes: an application corresponding to a launch entry of any application displayed in the first region; or an application corresponding to a launch entry of any application in the second display interface displayed in the second region; or an application corresponding to a launch entry of any application included in the side toolbar.

In some embodiments, the tenth response module 802 is further configured to: select the second information in the display interface of the fifth application; determine the launch entry of the sixth application corresponding to a first target position of the second information based on the tenth operation; switch the display interface of the fifth application displayed in the second region to the display interface of the sixth application; and determine a second target position to which the second information moves based on the tenth operation, and display the second information in the display interface of the sixth application.

In some embodiments, the third display module 803 is further configured to display the second information in a content editing region of the sixth application when the sixth application is a content editing application.

In some embodiments, the third display module 803 is further configured to: when the sixth application is a social application, display a contacts list included in the sixth application, open a chat box with a first contact corresponding to the second target position based on the tenth operation, and display the second information in an input region of the chat box; or when the sixth application is the social application, display a publishing region included in the sixth application, and display the second information in the publishing region.

In some embodiments, the apparatus 800 further includes a thirteenth receiving module 808 and a thirteenth response module 809.

The thirteenth receiving module 808 is configured to receive a thirteenth operation.

The thirteenth response module 809 is configured to switch, in response to the thirteenth operation, the first display interface to the second display interface.

Figure 35:
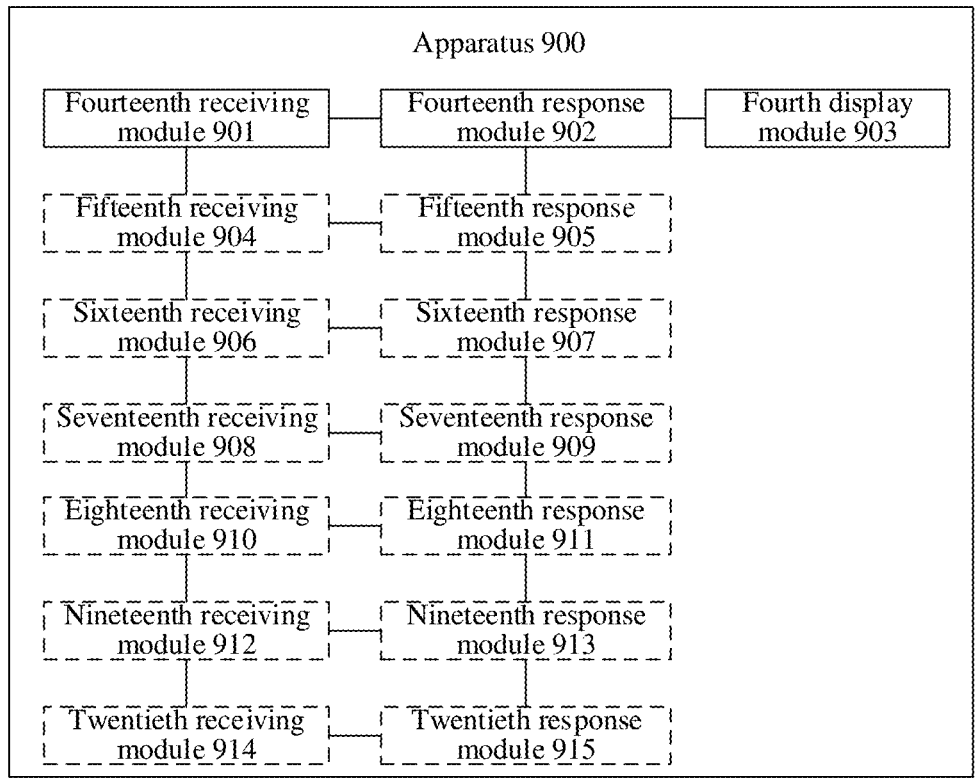
FIG. 35 is an optional schematic structural diagram of a third display apparatus according to an embodiment of the present disclosure.

FIG. 35 illustrates an optional schematic structural diagram of a third display apparatus according to an embodiment of the present disclosure, which will be described based on individual parts.

In some embodiments, an apparatus 900 includes a fourteenth receiving module 901, a fourteenth response module 902, and a fourth display module 903.

The fourteenth receiving module 901 is configured to receive a fourteenth operation.

The fourteenth response module 902 is configured to switch, in response to the fourteenth operation, a second display interface of the electronic device to a first display interface.

The fourth display module 903 is configured to display, in a second region of the first display interface, one or more launch entries of one or more applications in the second display interface, and display, in a first region of the first display interface, at least one launch entry of at least one application.

The at least one launch entry of the at least one application includes: one or more launch entries of a first number of applications run by the electronic device in a first time period; or one or more launch entries of one or more predetermined applications in a number smaller than or equal to the first number.

In some embodiments, the apparatus 900 further includes a fifteenth receiving module 904 and a fifteenth response module 905.

The fifteenth receiving module 904 is configured to receive a fifteenth operation.

The fifteenth response module 905 is configured to delete, in response to the fifteenth operation, a launch entry of an application corresponding to the fifteenth operation in the first region.

In some embodiments, the apparatus 900 further includes a sixteenth receiving module 906 and a sixteenth response module 907.

The sixteenth receiving module 906 is configured to receive a sixteenth operation.

The sixteenth response module 907 is configured to adjust, in response to the sixteenth operation, a display position of a launch entry of an application in the first region.

The fourth display module 903 is further configured to display, in the second region of the first display interface, the one or more launch entries of all of the one or more applications included in the second display interface minified by a first scale.

In some embodiments, the apparatus 900 further includes a seventeenth receiving module 908 and a seventeenth response module 909.

The seventeenth receiving module 908 is configured to receive a seventeenth operation.

The seventeenth response module 909 is configured to display, in the second region in response to the seventeenth operation, a side toolbar.

In some embodiments, the apparatus 900 further includes an eighteenth receiving module 910 and an eighteenth response module 911.

The eighteenth receiving module 910 is configured to receive an eighteenth operation after displaying the side toolbar in the second region.

The eighteenth response module 911 is configured to hide, in the second region in response to the eighteenth operation, the side toolbar.

In some embodiments, the apparatus 900 further includes a nineteenth receiving module 912 and a nineteenth response module 913.

The nineteenth receiving module 912 is configured to receive a nineteenth operation.

The nineteenth response module 913 is configured to display, in the second region in response to the nineteenth operation, a display interface of a fourth application corresponding to the nineteenth operation.

In some embodiments, the fourth application includes: an application corresponding to a launch entry of any application displayed in the first region; or an application corresponding to a launch entry of any application in the second display interface displayed in the second region; or an application corresponding to a launch entry of any application included in the side toolbar.

In some embodiments, the apparatus 900 further includes a twentieth receiving module 914 and a twentieth response module 915.

The twentieth receiving module 914 is configured to receive a twentieth operation.

The twentieth response module 915 is configured to switch, in response to the twentieth operation, the first display interface to the second display interface.

Figure 36:
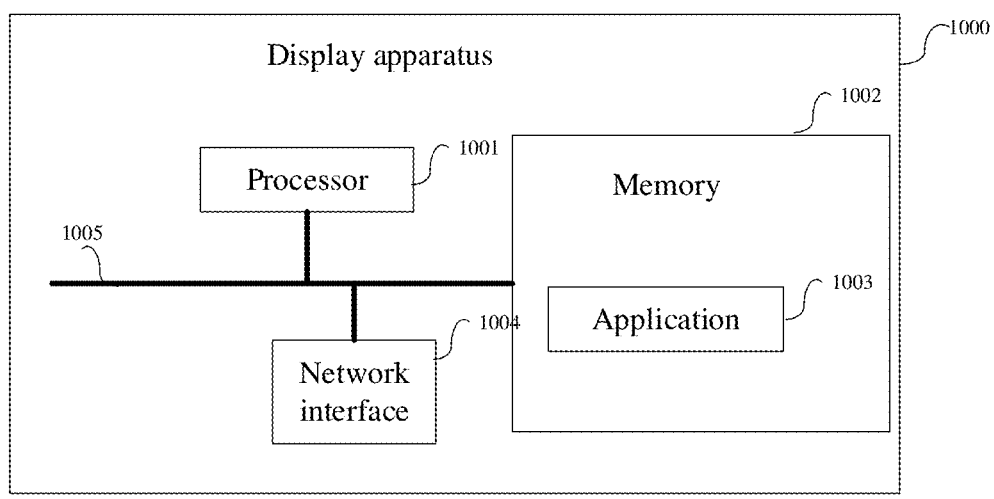
FIG. 36 is a schematic structural diagram of a hardware composition of a display apparatus according to an embodiment of the present disclosure.

FIG. 36 is a schematic structural diagram of a hardware composition of a display apparatus according to an embodiment of the present disclosure. A display apparatus 1000 includes at least one processor 1001, a memory 1002, and at least one network interface 1004. Various components of the display apparatus 1000 are coupled together via a bus system 1005. It can be appreciated that the bus system 1005 is configured to implement connections and communication among these components. The bus system 1005 further includes a power bus, a control bus, and a state signal bus in addition to a data bus. In the interest of clarity, however, all the buses are labeled as the bus system 1005 in FIG. 8.

It can be appreciated that the memory 1002 may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), a Ferromagnetic Random Access Memory (FRAM), a flash memory, a magnetic surface memory, an optical disc, or a Compact Disc Read-Only Memory (CD-ROM). The magnetic surface memory may be a disk memory or a magnetic tape memory. The transitory memory may be a Random Access Memory (RAM), which is used as an external cache. By way of illustration, rather than limitation, many forms of RAMs are available, including a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 1002 described in the embodiments of the present disclosure is intended to include, but not limited to, these and any other suitable types of memories.

The memory 1002 according to any of the embodiments of the present disclosure is configured to store various types of data to support operations of the display apparatus 1000. Examples of such data include any computer program for operation on the display apparatus 1000, e.g., an application 1003. A program for implementing the method according to any of the embodiments of the present disclosure may be included in the application 1003.

The method disclosed in the above embodiments of the present disclosure may be applied in or implemented by the processor 1001. The processor 1001 may be an integrated circuit chip with signal processing capability. In an implementation, the steps of the above method can be implemented by hardware integrated logic circuits in the processor 1001 or instructions in the form of software. The processor 1001 can be a general purpose processor, a Digital Signal Processor (DSP), another programmable logic device, a discrete gate or transistor logic device, or a discrete hardware component. The methods, steps, and logical block diagrams disclosed in the embodiments of the present disclosure can be implemented or performed by the processor 1001. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a storage medium. The storage medium can be located in the memory 1002. The processor 1001 can read information from the memory 1002 and perform the steps of the above methods in combination with its hardware.

In exemplary embodiments, the display apparatus 1000 may be implemented by one or more Application Specific Integrated Circuits (ASICs), DSPs, Programmable Logic Devices (PLDs), Complex Programmable Logic Devices (CPLDs), Field Programmable Gate Arrays (FPGAs), general purpose processors, controllers, Microcontroller Units (MCUs), Micro Processor Units (MPUs), or other electronic components, to perform the above methods.

Embodiments of the present disclosure further provide a storage medium for storing a computer program.

Optionally, the storage medium may be applied to a terminal device according to the embodiments of the present disclosure, and the computer program enables a computer to perform corresponding processes in each of the methods according to the embodiments of the present disclosure. Details thereof will be omitted here for simplicity.

The present disclosure is described with reference to flowcharts and/or block diagrams of the method, the device (system), and the computer program product according to the embodiments of the present disclosure. It should be understood that each process and/or block in the flowcharts and/or block diagrams, and a combination of processes and/or blocks in the flowcharts and/or block diagrams can be realized by computer program instructions. These computer program instructions can be provided to a processor of a general-purpose computer, a special-purpose computer, an embedded processor, or other programmable data processing device to generate a machine, such that instructions executed by the processor of the computer or other programmable data processing devices generate an apparatus for implementing functions specified in one or more processes in the flowchart and/or one or more blocks in the block diagram.

These computer program instructions can also be stored in a computer-readable memory that can guide a computer or other programmable data processing devices to work in a specific manner, such that instructions stored in the computer-readable memory produce an article of manufacture including an instruction device. The instruction device implements functions specified in one or more processes in the flowchart and/or one or more blocks in the block diagram.

These computer program instructions can also be loaded on a computer or other programmable data processing devices to enable a series of operation steps to be executed on the computer or other programmable devices for producing computer-implemented processing, such that instructions executed on the computer or other programmable devices provide steps for implementing functions specified in one or more processes in the flowchart and/or one or more blocks in the block diagram.

With the display method and apparatus and the storage medium according to the embodiments of the present disclosure, by receiving and responding to the first operation and adjusting the proportion of the first region, the electronic device is capable of displaying the at least one launch entry of the at least one application in the first region and displaying the display interface of the second application in the second region; or displaying the display interface of the first application in the first region and displaying the display interface of the second application in the second region, thereby realizing split-screen display of the first application and the second application through a few operation steps and improving screen splitting efficiency. In addition, according to the embodiments of the present disclosure, it is possible to achieve operations such as quick switching between the first display interface and the second display interface, editing of the at least one launch entry of the at least one application in the first display region, and content sharing between applications. The display method according to the embodiments of the present disclosure, which is simple and easy to implement, provides high operation efficiency, simplifies operation steps of users, improves operation efficiency, and enhances user experience.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A display method, comprising:
  receiving a first operation, wherein the first operation is used to adjust a proportion of a first region in a first display interface of an electronic device; and
  displaying, in the first region in response to the first operation, at least one launch entry of at least one application, when the proportion of the first region is smaller than or equal to a first threshold; and displaying, in the first region in response to the first operation, a display interface of a first application in the first region, when the proportion of the first region is greater than the first threshold,
  wherein when both the proportion of the first region and the proportion of a second region are greater than the first threshold, the first region and the second region display the display interface of the first application and the display interface of a second application, respectively,
  wherein when the proportion of the first region is greater than the first threshold and the proportion of the second region is smaller than or equal to the first threshold, the first region displays the display interface of the first application, and the second region of the first display interface displays the at least one launch entry of the at least one application, and
  wherein the at least one launch entry of the at least one application comprises one or more launch entries of a first number of applications run by the electronic device in a first time period, and the one or more launch entries of the first number of applications are displayed in the first region sequentially based on end-of-use time.

2. The method according to claim 1, further comprising:
  displaying a launch entry of the first application at a first position within the first region, when the proportion of the first region is switched from being greater than the first threshold to being smaller than or equal to the first threshold.

3. The method according to claim 1, further comprising, prior to receiving the first operation:
  receiving a second operation;
  switching, in response to the second operation, a second display interface of the electronic device to the first display interface; and
  displaying an interface of a second application corresponding to the second display interface in a second region of the first display interface and the launch entry of the at least one application in the first region; or
  displaying the second display interface minified by a first scale in the second region of the first display interface and the launch entry of the at least one application in the first region.

4. The method according to claim 3, further comprising, when the launch entry of the at least one application is displayed in the first region of the first display interface and the interface of the second application is displayed in the second region:
  receiving a third operation, wherein the third operation is used to select first information in a display interface of the second application;
  switching, in response to the third operation, the display interface of the second application displayed in the second region to a display interface of a third application; and
  displaying the first information in the display interface of the third application.

5. The method according to claim 4, wherein said switching, in response to the third operation, the display interface of the second application displayed in the second region to a display interface of a third application and displaying the first information in the display interface of the third application comprises:
  selecting the first information in the display interface of the second application;
  determining a launch entry of the third application corresponding to a first target position of the first information based on the third operation;
  switching the display interface of the second application displayed in the second region to the display interface of the third application; and
  determining a second target position to which the first information moves based on the third operation, and displaying the first information in the display interface of the third application.

6. The method according to claim 5, wherein said displaying the first information in the display interface of the third application comprises:
  displaying the first information in a content editing region of the third application when the third application is a first-class application.

7. The method according to claim 5, wherein said displaying the first information in the display interface of the third application comprises:
  when the third application is a second-class application, displaying a contacts list comprised in the third application, opening a chat box with a first contact corresponding to the second target position based on the third operation, and displaying the first information in an input region of the chat box; or when the third application is the second-class application, displaying a publishing region comprised in the third application, and displaying the first information in the publishing region.

8. The method according to claim 1, further comprising, prior to receiving the first operation:
setting at least one situational mode, wherein each of the at least one situational mode is used to indicate a launch entry of an application displayed in the first region when the proportion of the first region is smaller than or equal to the first threshold.

9. The method according to claim 8, further comprising, subsequent to setting the at least one situational mode:
establishing a shortcut to one of the at least one situational mode, wherein the shortcut is used to activate the one of the at least one situational mode.

10. The method according to claim 9, wherein said establishing the shortcut to one of the at least one situational mode comprises:
adding an icon for the one of the at least one situational mode in a third region;
activating the one of the at least one situational mode, based on a touch operation performed on the icon for the one of the at least one situational mode.

11. The method according to claim 1, wherein when the proportion of the first region is greater than the first threshold, a display interface of a second application is displayed in a second region of the first display interface, the second region being completely non-overlapping with the first region.

12. The method according to claim 1, wherein when the proportion of the first region is greater than the first threshold, a main interface of the electronic device is displayed in a second region of the first display interface.

13. The method according to claim 1, wherein when the proportion of the first region is greater than the first threshold, the launch entry of the at least one application is displayed in a second region of the first display interface, the second region being completely non-overlapping with the first region.

14. A display apparatus, comprising:
a memory;
a processor; and
an executable program stored on the memory and executable by the processor,
wherein the processor, when executing the executable program, performs actions comprising:
receiving a first operation, wherein the first operation is used to adjust a proportion of a first region in a first display interface of an electronic device; and
displaying, in the first region in response to the first operation, at least one launch entry of at least one application, when the proportion of the first region is smaller than or equal to a first threshold; and displaying, in the first region in response to the first operation, a display interface of a first application in the first region, when the proportion of the first region is greater than the first threshold,
wherein when both the proportion of the first region and the proportion of a second region are greater than the first threshold, the first region and the second region display the display interface of the first application and the display interface of a second application, respectively,
wherein when the proportion of the first region is greater than the first threshold and the proportion of the second region is smaller than or equal to the first threshold, the first region displays the display interface of the first application, and the second region of the first display interface displays the at least one launch entry of the at least one application, and
wherein the at least one launch entry of the at least one application comprises one or more launch entries of a first number of applications run by the electronic device in a first time period, and the one or more launch entries of the first number of applications are displayed in the first region sequentially based on end-of-use time.

15. The display apparatus according to claim 14, wherein the actions further comprise, prior to receiving the first operation:
receiving a second operation;
switching, in response to the second operation, a second display interface of the electronic device to the first display interface.

16. The apparatus according to claim 14, wherein the actions further comprise:
receiving a fourth operation; and
deleting, in response to the fourth operation, a launch entry of an application corresponding to the fourth operation in the first region.

17. The apparatus according to claim 14, wherein the actions further comprise, prior to receiving the first operation:
setting at least one situational mode, wherein each of the at least one situational mode is used to indicate a launch entry of an application displayed in the first region when the proportion of the first region is smaller than or equal to the first threshold.

18. A non-transitory storage medium, having an executable program stored thereon, wherein the executable program, when executed by a processor, implements the display method according to claim 1.

* * * * *